United States Patent
Nucci et al.

(10) Patent No.: US 7,353,294 B1
(45) Date of Patent: *Apr. 1, 2008

(54) METHOD FOR ESTIMATING A TRAFFIC MATRIX IN A COMMUNICATION NETWORK USING STATIONARY DATA

(75) Inventors: Antonio Nucci, Burlingame, CA (US); Nina Taft, San Francisco, CA (US)

(73) Assignee: Sprint Communications Company L.P., Overland Park, KS (US)

(*) Notice: Subject to any disclaimer, the term of this patent is extended or adjusted under 35 U.S.C. 154(b) by 889 days.

This patent is subject to a terminal disclaimer.

(21) Appl. No.: 10/702,698

(22) Filed: Nov. 6, 2003

(51) Int. Cl.
*G06F 15/173* (2006.01)
(52) U.S. Cl. .................................... 709/241; 370/238.1
(58) Field of Classification Search ............... 709/226, 709/238–242, 245; 370/229–238.1
See application file for complete search history.

(56) References Cited

U.S. PATENT DOCUMENTS

| | | | |
|---|---|---|---|
| 6,574,669 B1* | 6/2003 | Weaver | 709/239 |
| 6,721,270 B1* | 4/2004 | Mitra et al. | 370/230 |
| 7,185,104 B1* | 2/2007 | Thorup et al. | 709/235 |
| 2003/0142627 A1* | 7/2003 | Chiu et al. | 370/238 |
| 2003/0185153 A1* | 10/2003 | Kohler et al. | 370/230 |
| 2003/0214938 A1* | 11/2003 | Jindal et al. | 370/351 |
| 2004/0170125 A1* | 9/2004 | O'Neill | 370/230 |

* cited by examiner

*Primary Examiner*—Abdullahi Salad

(57) ABSTRACT

The present invention comprises methods for increasing the rank of the routing matrix of an IP network by systematically altering link weights in the IP network. A full rank routing matrix may be used with further methods in accordance with the present invention to estimate the mean traffic of the IP network based upon the full rank routing matrix and measured link utilization values. The mean traffic and the covariance of the traffic may be iteratively estimated until the estimates coverage. Example methods in accordance with the present invention for estimating mean traffic and covariance of traffic are described for both stationary and non-stationary link utilization data.

20 Claims, 6 Drawing Sheets

METHOD FOR ESTIMATING A TRAFFIC MATRIX IN A COMMUNICATION NETWORK USING STATIONARY DATA

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to the modeling and forecast of traffic in an IP network. More particularly, the present invention relates to the improved modeling and forecasting of network traffic by systematically modifying the weights assigned to links in an IP network to create a full rank routing matrix for the network. Once a full rank routing matrix is obtained, through any method, network traffic is modeled by iteratively estimating the traffic and the variance of the traffic until the estimates converge.

BACKGROUND OF THE INVENTION

Internet protocol networks, often referred to as IP networks, are complex systems used by telecommunication service providers to provide high bandwidth transmission of data packets, often over long distances. Data transmitted over an IP network may be internet related data, but may also be data for any other purpose, such as voice telephone calls transmitted using voice over IP protocols.

An IP network comprises a plurality of high bandwidth links, such as high capacity fiber optic cables or, more typically a bundle of high capacity fiber optic cables, connecting telecommunication equipment, such as routers. Routers and other equipment may be co-located in points of presence, often referred to as PoPs. Packets of data are transmitted from a first router to a second router over the intermediate link connecting the first and second routers. To transmit a data packet from an origin router in an IP network to the destination router, the data packet is transmitted in a series of "hops" from one router to the next until it reaches its destination. The node at which a packet begins is referred to as the origin node, with the final node being referred to as the destination node. At each router on the path, that router independently determines the shortest path route to the destination and transmits the packet on the next hop of that shortest path route. A measure of the total traffic on any link of the IP network may be obtained by measuring packets transmitted or received by the routers connected by that link, as each link joins two, and only two, routers. Accordingly, the total amount of traffic on a link over a given time period may be determined based upon the traffic transmitted and/or received by the routers on either end of that link over the link. A variety of methods are currently used to measure link utilization values, and other methods may be developed in the future.

While information describing the total utilization of the links in an IP network can be useful, telecommunication service providers often seek to obtain a measure of the traffic between pairs of origin and destination nodes of the IP network, rather than simply the volume of traffic on links in the IP network. By knowing the traffic passing between pairs of origin and destination nodes, network operators can better plan future network development and better manage network traffic through setting appropriate link weights to optimize network performance.

Optimizing network performance can be a critical issue for telecommunication service providers operating IP networks. Large scale IP networks are expensive investments, and upgrading an IP network to, for example, add additional links to accommodate increasing traffic demand, requires both significant capital investment and considerable time for planning, preparation, and installation.

However, optimal planning and management of an IP network can occur only if adequate information regarding network traffic is available to the network operators. The present invention provides improved methods for modeling current network activity and forecasting future network activity.

SUMMARY OF THE INVENTION

Methods in accordance with the present invention provide improved modeling and forecasting of network traffic in an IP network. In accordance with the present invention, additional network information may be obtained by systematically perturbing the network by altering the weights assigned to links in the network to increase the rank of the IP network's routing matrix, possibly even making the routing matrix full rank. The present invention also provides new methods for modeling network traffic using a full rank routing matrix, without regard to how the full rank routing matrix was obtained. The various methods of the present invention may be used separately or together to provide improved modeling and forecasting of traffic for an IP network.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
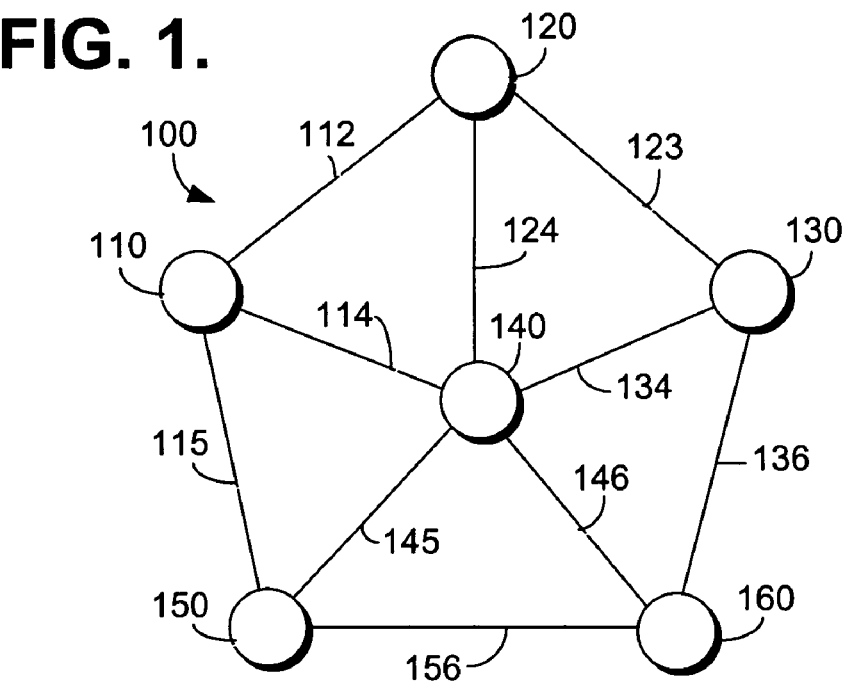
FIG. 1 illustrates an example of a portion of an IP network.

FIG. 1 illustrates a portion of an IP network for which methods in accordance with the present invention may be utilized to collect traffic information and to model traffic between nodes of the network. Portion 100 of the IP network may comprise a plurality of links connecting a plurality of nodes. Previously, a node has been described as a router and a link as a bundle of several high bandwidth fiber optic cable connecting a pair of routers. Nodes and links may be conceptualized in other ways as well. For example, what is described as a node may also be a PoP, an area code, or another higher level grouping of equipment, and therefore could include a plurality of routers. If a node is conceptualized as an individual router, the links connecting the nodes will be bundles of cables joining the routers. If nodes are conceptualized on the level of PoPs, area codes or other higher levels, then the links connecting the nodes may be a collection of the individual links connecting the routers in each node. In actual use of the present invention, any level of abstraction may be utilized in describing nodes and links. As described further herein, nodes are presented as PoPs, but the methods described can be easily adapted by one skilled in the art for use at other layers of abstraction.

IP network portion 100 may comprise a first node 110, a second node 120, a third node 130, a fourth node 140, a fifth node 150, and a sixth node 160. A plurality of links connect the nodes of portion 100. For example, link 112 connects node 110 and node 120. Link 114 connects node 110 and node 140. Link 115 connects node 110 and node 150. Link 123 connects node 120 and node 130. Link 124 connects node 120 and node 140. Link 134 connects node 130 and node 140. Link 136 connects node 130 and node 160. Link 145 connects node 140 and node 150. Link 146 connects node 140 and node 160. Link 156 connects node 150 and node 160. It should be noted that links may be unidirectional or bi-directional in accordance with the present invention.

Portion 100 of an IP network illustrated in FIG. 1 may be used to illustrate, in part, the difficulty in modeling and forecasting traffic in an IP network. Suppose, for example, that link 114 is congested, meaning that traffic on link 114 exceeds a threshold amount at which the transmission of data over link 114 becomes slowed or subject to packet loss. As illustrated in FIG. 1, the excessive traffic on link 114 must be due to packets being transmitted between node 110 and node 140. The amount of traffic on link 114 may be readily measured, but the origin nodes and destination nodes for the packets that make up the traffic are not known. One way of addressing the overload of link 114 could be to construct an additional link connecting node 110 and node 140. However, the construction of an additional link, which typically involves considerable expense and time, may not be necessary. For example, data originating from node 110 and ultimately destined for node 130 may be responsible for the congestion on link 114. If link 112 and link 123 have available extra capacity, rather than incurring the expense of constructing a new link, data could be rerouted from node 110, via link 112, to node 120, and then via link 123 to destination node 130. One skilled in the art will appreciate that numerous other scenarios may likewise be responsible for congestion on a given link in the network and may also be addressed by changing the routing of packets rather than by building a new link. With only link utilization values, which often may be all that are available to a network operator, modeling current traffic behavior of an IP network can be, to say the least, difficult, and forecasting future traffic can be virtually impossible.

Network traffic in an IP network may be described using matrices. Even the relatively small portion 100 of an IP network illustrated in FIG. 1 is difficult to model mathematically without the use of matrices. Three matrices are often used to model a traffic in an IP network. A link utilization matrix, which may be a column vector, describes link utilization for the links in the IP network, which can be measured as described above. A traffic matrix, which may also be a column vector, describes the traffic originating and destined for each pair of nodes in the network. The estimation of the traffic matrix is needed to model and effectively forecast network traffic, and it is ultimately estimated in accordance with the present invention. The routing of traffic over the network can be described using a routing matrix, which can be determined based upon the weights assigned links in the network as described below.

One skilled in the art will have a basic understanding of linear algebra. Using linear algebra and matrix notation, traffic in an IP network may be described as $Y(k)=A(k)X(k)$. In this notation, k denotes a discrete time. $Y(k)$ is the link utilization vector at a time k, which may be constructed using the link utilization measurements for each link in the IP network. $A(k)$ is the routing matrix of the IP network at a time k. It should be noted that in many IP networks link weights are rarely changed, meaning that the routing matrix rarely changes, and is therefore often denoted simply as A. The routing matrix determines how traffic between any given pair of nodes is routed. The routing matrix may be determined using the weights assigned links in the network. For example, in further reference to FIG. 1, each of the plurality of links in portion 100 of an IP network may be assigned a numerical weight. Often, the weights assigned links in an IP network are all within a certain predetermined range, for example, between five and fifty, although if a range is used any is permissible. Often, link weights are restricted by network operators to integer values, but such a restriction is not necessary to the present invention. The shortest path route between a pair of nodes may be defined as the route for which the sum of the weights of the links is the lowest possible. Under this definition, a route between an origin and destination node comprising five links, each assigned a weight of one, would be a shorter path than another possible route comprising two links, each assigned a weight of three. In further reference to FIG. 1, if, for example, the shortest route path between node 110 and node 130 was from node 110 to node 140 via link 114, and then to node 130 via link 134, the routing matrix would direct all traffic between node 110 and node 130 over link 114 and link 134, with no traffic between link 110 and link 120 being directed to the other links in portion 100 of the IP network.

Each entry in a routing matrix corresponds to a link in the IP network and an origin-destination node pair. While a variety of IP network routing rules may be used, often only one shortest path route is permitted between an origin-destination node pair. If the link corresponding to an entry is on the only shortest path route between the corresponding origin-destination node pair, then the entry in the routing matrix will be one, meaning that all traffic between the node pair in question will be routed on that link. If the link corresponding to an entry is not on a shortest path route between the corresponding origin-destination node pair, then the entry in the routing matrix will be zero, meaning that no traffic between the node pair in question will be routed on that link. One skilled in the art will realize that in some IP networks, a practice referred to as route splitting is permitted, in which case more than one shortest path routes may be used for an origin-destination node pair. If route splitting is permitted in an IP network an entry in the IP network's routing matrix may be fractional, meaning that the equivalent fraction of traffic between the corresponding origin-destination node pair will be routed on that link. The present invention may be applied in IP networks permitting route splitting, but route splitting is not necessary to the practice of the present invention.

$X(k)$ is a vector describing the traffic between each pair of nodes. Each entry in $X(k)$ corresponds to the amount of traffic from one origin node to one destination node at a time k. The dot product of $X(k)$ and $A(k)$ yields the link utilization vector Y(k). A(k) is known, and Y(k) may be measured. The goal, then is to completely and definitely solve for X(k) using the known A(k) and Y(k). However, solving for X(k) in most IP networks has not been possible. Just in the portion 100 of an IP network illustrated in FIG. 1, there are fifteen node pairs. Since in each of the fifteen node pairs either node may be the origin node and either node may be a destination node, there are thirty origin-destination node pairs in portion 100. While there are thirty origin-destination node pairs for which a network operator would like to model traffic patterns, there exist only ten links for which utilization values are available. One with a basic knowledge of linear algebra will realize that the thirty unknowns in X(k) cannot all be solved using a maximum of ten independent linear equations. Frequently, however, the problem solving for X(k) is greater than a lack of utilization values. Often, the routing matrix includes numerous rows that are not linearly independent from other rows in the routing matrix. The lack of a sufficient number of linearly independent rows in the routing matrix may be described in the terminology of linear algebra as the routing matrix not being full rank. To fully solve for X(k) requires a full rank routing matrix.

Figure 2:
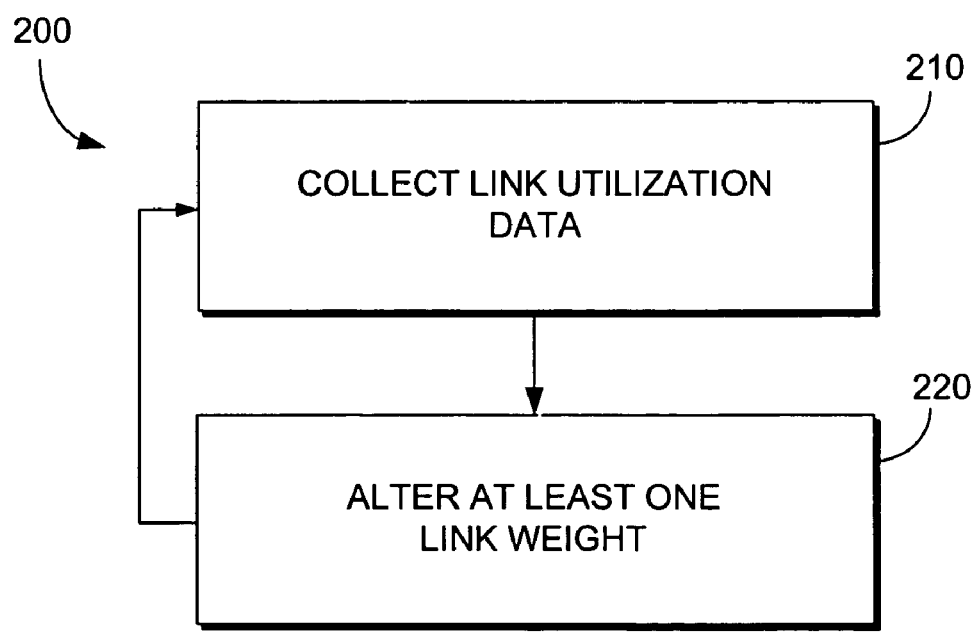
FIG. 2 illustrates a method in accordance with the present invention for expanding the rank of the routing matrix for an IP network.

Referring now to FIG. 2, a method 200 for increasing the rank of the routing matrix of an IP network in accordance with the present invention is illustrated. In step 210, link utilization data is collected. Step 210 may be performed in any way. In step 220, at least one link weight is altered. Step 220 may serve to redirect traffic in the IP network by changing the shortest route path for one or more origin-destination node pairs. This rerouting of traffic will create a new routing matrix and a network traffic vector that may then be used as additional data in solving for the traffic matrix. Method 200 then returns to step 210 and link utilization data is collected with the at least one altered link weight. Method 200 may be repeated a predetermined number of times, or may be iteratively repeated until a full rank routing matrix is obtained. If method 200 is repeated a predetermined number of times, the number of times method 200 is repeated may vary depending upon the IP network with which method 200 is used, and may be the number of times expected in order to obtain a full rank routing matrix, although a lower or higher number of iterations may also be used.

Figure 3A:
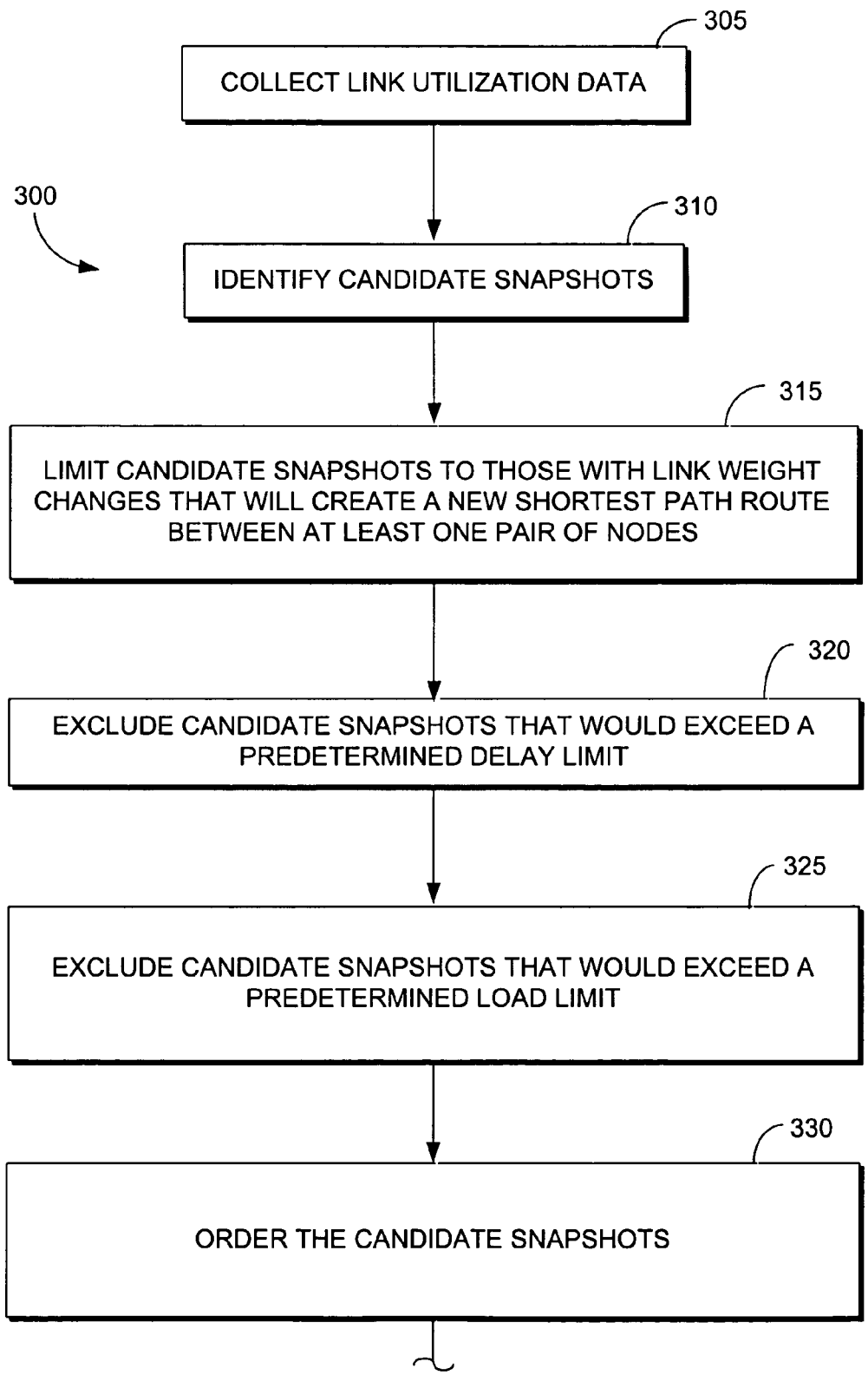
FIG. 3a and FIG. 3b illustrate a further method in accordance with the present invention for expanding the rank of a routing matrix for an IP network.
Figure 3B:
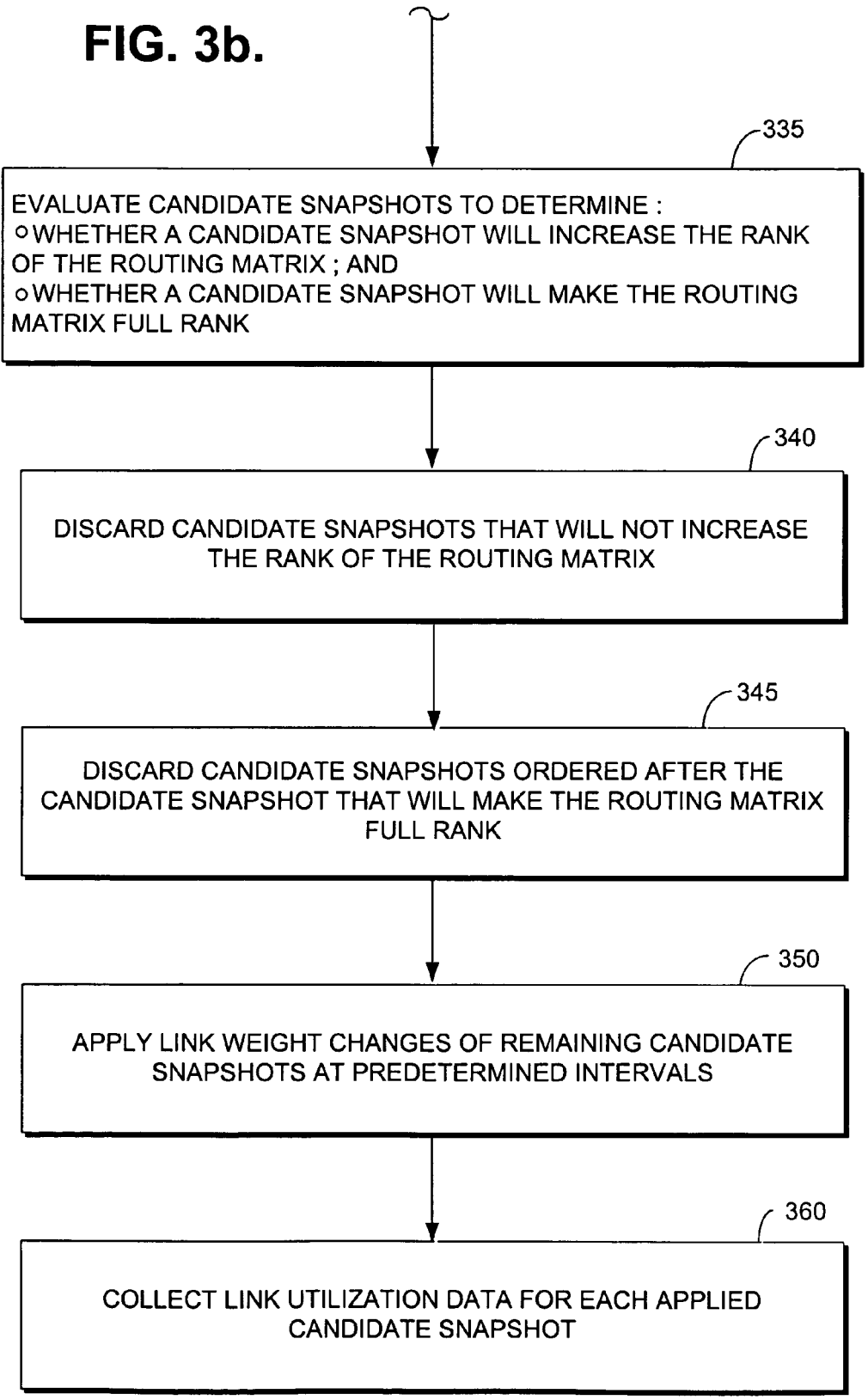

Referring now to FIG. 3a and FIG. 3b, a further method 300 in accordance with the present invention for increasing the rank of the routing matrix of an IP network by altering link weights is illustrated. In step 305, link utilization data is collected. Step 305 may comprise collecting link utilization data during the IP network's normal operation. Step 305 may be omitted from methods in accordance with the present invention. Step 305 may be performed in many IP networks as part of normal network monitoring. In step 310, candidate snapshots are identified. A snapshot may be thought of as a set of link weights for the IP network. Depending upon what, if any, restrictions are placed upon the setting of link weights in an IP network, step 310 may identify a very large number, theoretically even an infinite number, of candidate snapshots. Accordingly, step 310 may be performed in conjunction with other steps of method 300 to limit the number of candidate snapshots.

In step 315, candidate snapshots may be limited to those with link weight changes that will create a new shortest path route between at least one origin-destination node pair. If a link weight change does not change the shortest path route for at least one origin-destination node pair, it will not alter the routing matrix and therefore will not result in an increase in the rank of the routing matrix for the IP network and therefore will not aid in solving for the traffic matrix. Therefore, a snapshot excluded in step 315 would not provide new network information if used.

In step 320 candidate snapshots may be limited to those that comply with predetermined network performance parameters by excluding snapshots that would exceed a predetermined delay limit. In an IP network, the end-to-end delay of a connection, sometimes referred to as the latency, can be an important issue. The delay is the total amount of time required for a data packet to traverse the network from origin to destination. An end-to-end delay outside of certain parameters, which may vary from network to network and from application to application, may be unacceptable. Often, the delay associated with any link or node in an IP network may be known. With this delay information, the end-to-end delay for each origin-destination node pair's shortest route path may be determined. The delay limit of step 320 may be defined in a variety of ways, such as the average end-to-end delay between origin-destination node pairs in the IP network, the average delay of a link, or in other ways. For example, if the end-to-end delay for any of the shortest route paths exceeds a predetermined maximum allowable delay limit, that snapshot could be rejected in step 320. As a further example, a delay limit could be defined for every origin-destination node pair, with a snapshot being excluded if one or some other predetermined number of node pairs would have a shortest path route with an end-to-end exceeding that node pair's delay limit. Other delay limits may also be used. It should be noted that step 320 may be omitted from methods in accordance with the present invention for any reason, particularly if connection delay is not an important consideration in the operation of a given IP network.

In step 325, candidate snapshots may be limited to those that comply with the predetermined network performance parameters by excluding snapshots that would exceed a predetermined load limit. As with the delay limit, the load limit may be expressed in a variety of ways, such as the average load on links in the IP network or the load on each link in the network. If a link in an IP network experiences load demands above certain amounts, which may vary from link to link, network performance on that link may suffer. Examples of common problems for an overloaded link include increased delay and packet loss. The load on a link may be predicted in a variety of ways. For example, methods in accordance with the present invention may have been performed using the IP network previously, thereby allowing the load on a link to be predicted using a previously obtained traffic matrix or previously obtained link utilization values measured with the same or a similar snapshot. While forecasting the demand likely to be placed upon any given link in the IP network without using methods in accordance with the present invention may be difficult and inexact, a rough prediction of link utilization for the links in the IP network may be made using other approximation techniques. In some circumstances, methods in accordance with the present invention may have already been performed in which case a previously obtained traffic matrix may be used to obtain a prediction of link utilization. If the predicted utilization, however defined or predicted, exceeds a predetermined limit, such as eighty percent of a links capacity, that snapshot may be rejected in step 325. Step 325 may be omitted from methods in accordance with the present invention.

In step 330, the candidate snapshots remaining are ordered from those likely to provide the most new network traffic information to those likely to provide the least network traffic information. Step 330 of ordering candidate snapshots may greatly reduce the number of snapshots needed to obtain a full rank routing matrix. A variety of criteria may be used to determine how likely a candidate snapshot is to provide new network traffic information and how much new network traffic information a snapshot is likely to provide. For example, the number of origin-destination node pairs that will have their shortest path route changed by a snapshot may be one indication of the amount of network traffic information a snapshot is likely to provide. Another possibility would be to determine the number of node pairs which will become well known, which shall be described further below, by applying a candidate snapshot. A ranking function may be used to order the candidate snapshots. An example of one acceptable ranking function is described below. It should be noted that step 330 may be omitted from methods in accordance with the present invention.

In step 335, the candidate snapshots may be evaluated in the order determined in step 330 to determine whether a candidate snapshot will increase the rank of the routing matrix and whether a candidate snapshot will result in the routing matrix becoming full rank. Evaluation step 335 may be performed in conjunction with discarding step 340 and discarding step 345 to eliminate snapshots that will not increase the rank of the routing matrix or that are not necessary to obtain a full rank routing matrix. It should be noted that step 330 of ordering the candidate snapshots allows step 335 to evaluate candidate snapshots in an order that begins with the candidate snapshots most likely to increase the rank of the routing matrix and thereby likely to most rapidly result in a full rank routing matrix. If step 330 is omitted, step 335 may be performed on the candidate snapshots in any order, although this may drastically increase the computational resources required to perform step 335 of evaluating the candidate snapshots. In step 340, candidate snapshots that will not increase the rank of the routing matrix are discarded. Even a candidate snapshot that will change the shortest path route between an origin-destination node pair and therefore was not excluded in step 315 may be discarded in step 340 if the candidate snapshot's routing matrix is not linearly independent from the routing matrix of a prior snapshot. In step 345 candidate snapshots ordered after the candidate snapshot that will make the routing matrix full rank are discarded. While step 345 may be omitted, once the routing matrix of an IP network is full rank, the traffic matrix may be fully estimated and additional application of snapshots is unnecessary. If step 330 of ordering the candidate snapshots is omitted, step 345 may discard the remaining unevaluated snapshots when a candidate snapshot that will make the routing matrix full rank is identified. It should be noted, however, that if step 330 of ordering the snapshots is omitted, more snapshots will likely be required to obtain a full rank routing matrix.

In step 350, the link weight changes of the remaining candidate snapshots are applied at predetermined intervals, and may be applied in the order determined in step 330. In step 360, link utilization values are collected for each candidate snapshot. These additional link utilization values and the associated additional routing matrices may be used in any way, although exemplary methods in accordance with the present invention utilizing this additional information to model the IP network's traffic matrix are further described below.

Figure 4A:
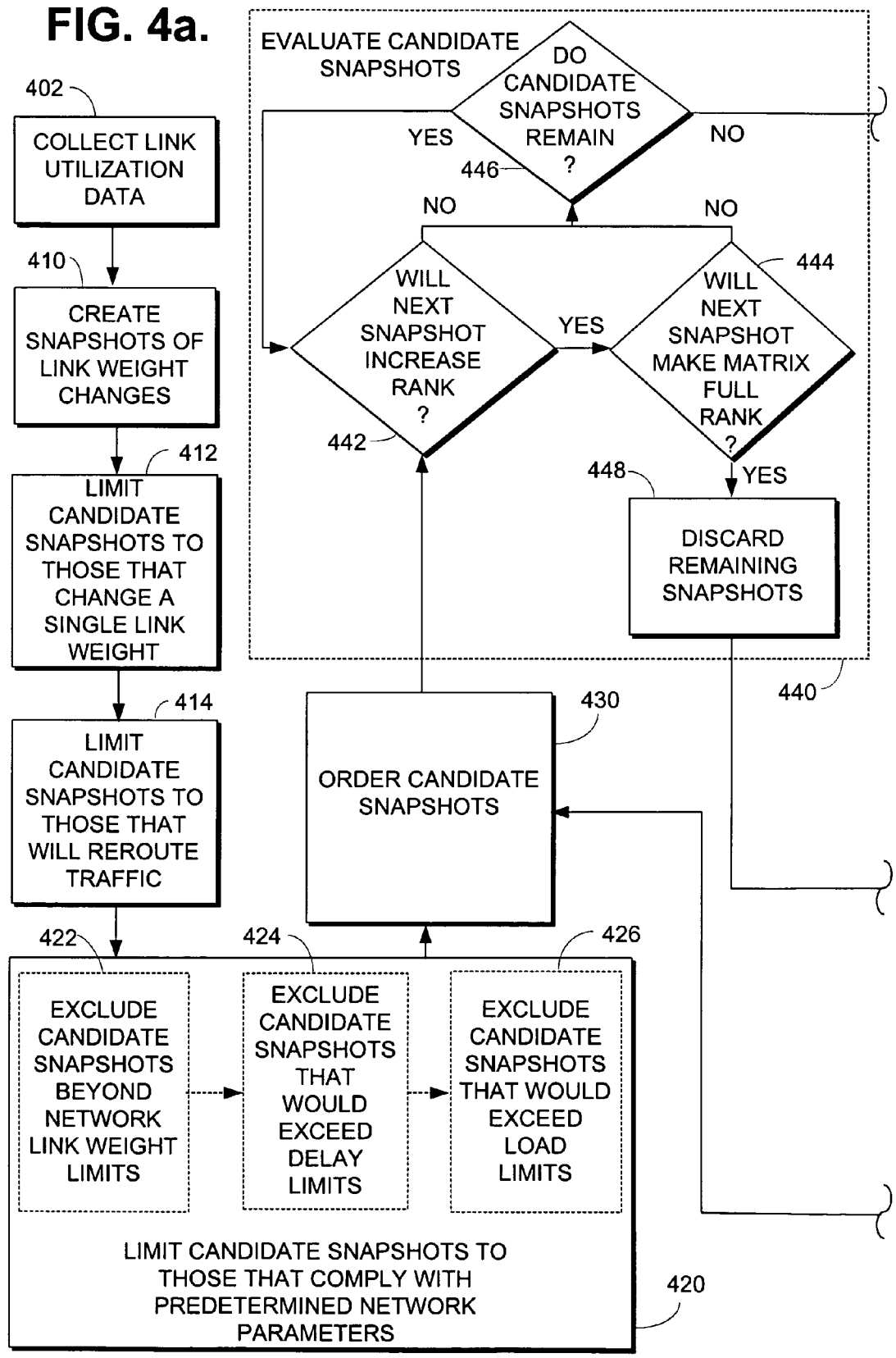
FIG. 4a and FIG. 4b illustrate a further method in accordance with the present invention for expanding the rank of a routing matrix for an IP network.
Figure 4B:
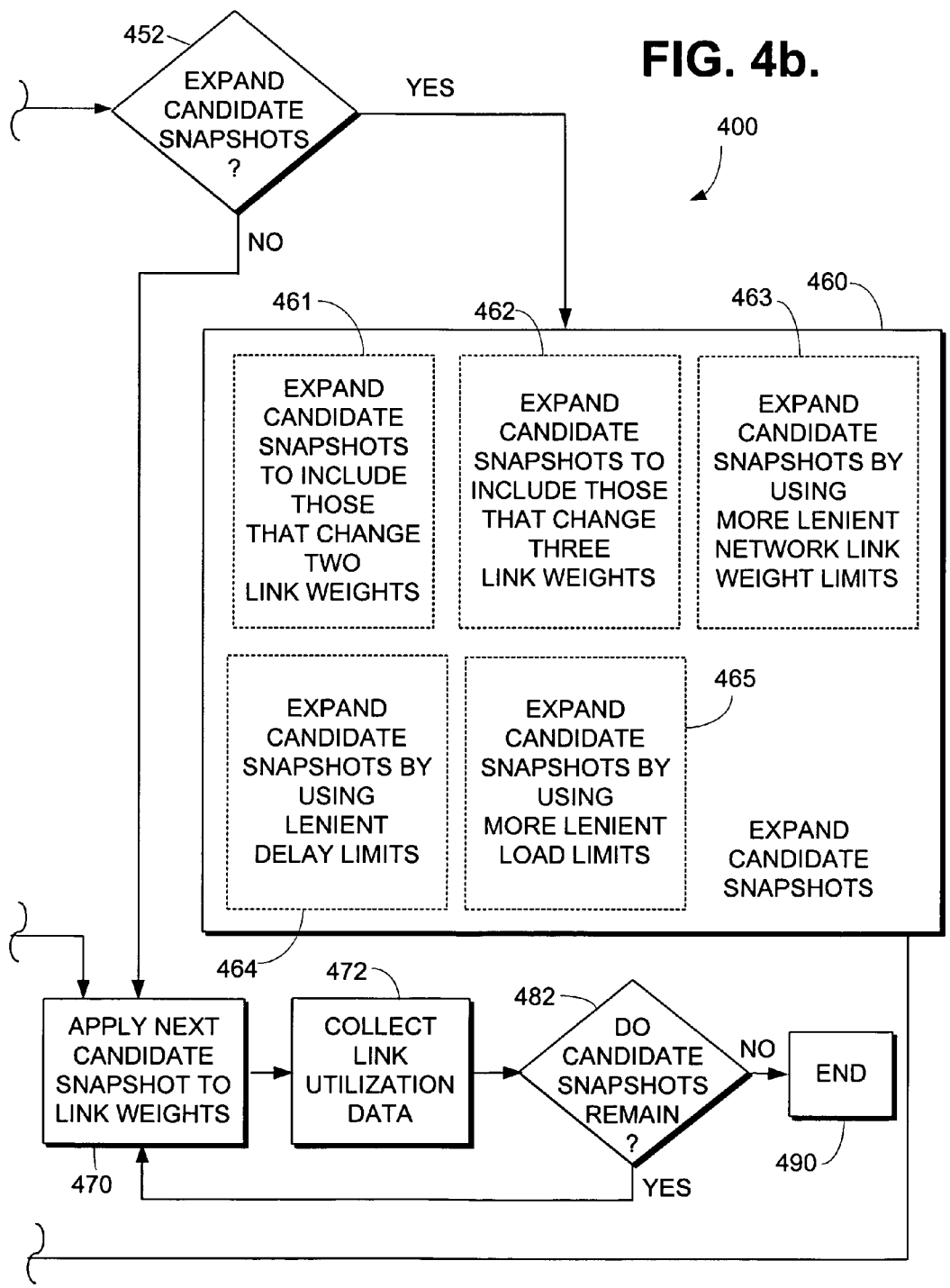

Referring now to FIG. 4a and FIG. 4b, a further method 400 in accordance with the present invention for increasing the rank of an IP network's routing matrix by altering link weights in the IP network is illustrated. In step 402, link utilization data is collected. Step 402 may comprise collecting link utilization data during an IP network's normal operation. Step 402 may be omitted from methods in accordance with the present invention.

In step 410, snapshots of link weight changes are created. Depending upon what, if any, restrictions are placed upon the setting of link weights in an IP network, step 410 may identify a very large number, theoretically even an infinite number, of candidate snapshots. Accordingly, step 410 may be performed in conjunction with other steps of method 400 to limit the number of candidate snapshots.

In step 412, candidate snapshots may be limited to those that alter a single link weight. Step 412 serves to restrict candidate snapshots, at least initially, to snapshots that change only one link weight, which may be preferable in some IP networks because a change to a single link weight is less likely to drastically alter network performance in an unpredictable or unacceptable fashion. Step 412 may be omitted, and such omission may be desirable in circumstances where a network operator desires to minimize the total number of snapshots applied to obtain a full rank routing matrix. Step 412 may also be modified to limit candidate snapshots that alter a number of link weights, or a range of link weights, other than one. A change of multiple link weights in a single snapshot may be more likely to generate significant changes to the routing matrix, and, hence, more rapidly bring the routing matrix to full rank than a snapshot with a single weight change. Step 412 may also be incorporated as a substep in step 420, which is described further below.

In step 414, candidate snapshots may be limited to those with link weight changes that will reroute network traffic by changing the shortest route path between at least one origin-destination node pair. As explained above with regard to example method 300, if a candidate snapshot does not reroute traffic between at least one pair of nodes, it will not provide additional network information and will not increase the rank of the routing matrix.

In step 420, candidate snapshots may be limited to those that comply with predetermined network parameters. While step 420 may be omitted from methods in accordance with the present invention, it serves to provide at least some assurance that the IP network will function properly at all times by excluding candidate snapshots that would be likely to impair IP network operation. Step 420 may be used to assure that no candidate snapshot is applied that will violate operating parameters of the IP network. Snapshots excluded in step 420 may be retained, for example in a separate computer file, for subsequent use if candidate snapshots need to be expanded to obtain a full rank routing matrix. While step 420 is not limited to any particular parameter or set of parameters, examples are substep 422 of excluding candidate snapshots beyond network link weight limits, substep 424 of excluding candidate snapshots that would exceed delay limits, and substep 426 of excluding candidate snapshots that would exceed load limits.

Substep 422 of excluding candidate snapshots that are beyond network link weight limits may serve to constrain the range in which link weights are adjusted in a snapshot. Substep 422 may require that the final link weight be within a specified range, such as between a numerical value of five and fifty, or may limit how much the weight of a given link can be changed in a snapshot, for example, not allowing a link weight to be adjusted upward or downward more than five. Substep 422 may use link weight limits more, or even less, stringent than limits placed on link weights in normal IP network operation, but may also be the same. It should be noted that substep 422 may be incorporated into step 410, so that the only snapshots created or those that comply with the network link weight limits.

Substep 424 of excluding candidate snapshots that would exceed delay limits may operate in a variety of ways, as described above with regard to step 320 of method 300. Substep 424 may be omitted from methods in accordance with the present invention.

Substep 426 of excluding candidate snapshots that would exceed load limits may serve to exclude candidate snapshots that would exceed load limits may operate in a variety of ways, as described above with regarding to step 325 of method 300. Substep 426 may be omitted from methods in accordance with the present invention.

One skilled in the art will realize that step 420 may comprise any number and any variety of substeps, if step 420 is used in a method in accordance with the present invention. Step 420 may assure that candidate snapshots meet one, a few, or even many network parameters. Network parameters applied in step 420 may include parameters beyond those described in substep 422, substep 424, and substep 426. Step 420 may also apply network parameters in multiple ways. For example, network parameters for delay may exclude candidate snapshots based upon average end-to-end delay, maximum permissible end-to-end delay for each origin-destination node pair, and maximum permissible end-to-end delay for each link in the IP network. Load limit network parameters and other network parameters may likewise be applied to candidate snapshots in multiple ways by step 420.

In step 430, candidate snapshots may be ordered based on the amount of network traffic information each snapshot is likely to provide. Other orderings of candidate snapshots, including the order in which the snapshots were created, may also be used, although other orderings are likely to increase the number of snapshots required to obtain a full rank routing matrix. Step 430 may also be omitted from methods in accordance with the present invention, although the use of ordering step 430 may serve to permit other steps of method 400 to proceed more efficiently. One skilled in the art will note that step 430 is similar to step 330 of method 300. Step 330 may be performed using a ranking function. An example of one suitable ranking function is described below.

In step 440 candidate snapshots may be evaluated. Step 440 of evaluating candidate snapshots serves to eliminate candidate snapshots that will not increase the rank of the IP network's routing matrix or that are not needed to obtain a full rank routing matrix. Step 440 of evaluating the candidate snapshots may comprise a series of discrete substeps. While example substeps are described herein, other substeps and/or other ordering of substeps may also be used. In substep 442, it is determined whether the next snapshot will increase the rank of the routing matrix of the IP network. If the conclusion of substep 442 is yes, the next snapshot will increase the rank of the routing matrix, method 400 proceeds to substep 444 to determine whether the next snapshot will make the routing matrix for rank. If the result of substep 442 is no, the next candidate snapshot will not increase the rank of the routing matrix, method 400 proceeds to substep 446. In substep 446, it is determined whether candidate snapshots remain. If candidate snapshots remain, method 400 returns to substep 442 to evaluate the next candidate snapshot. If no candidate snapshots remain, substep 446 proceeds to step 452, as described further below. If the result of substep 442 is the conclusion that, yes, the next candidate snapshot will increase the rank of the routing matrix, method 400 proceeds to substep 444. In substep 444, it is determined whether the next candidate snapshot will make the routing matrix full rank. If the conclusion is no, method 400 proceeds to substep 446, wherein it is determined whether candidate snapshots remain, as discussed above. If the conclusion of substep 444 is yes, that next candidate snapshot will make the routing matrix full rank, method 400 proceeds to substep 448. In substep 448, the remaining candidate snapshots are discarded. The method thereafter proceeds to step 470, as shall be discussed further below. In substep 446, a response of no indicates that no candidate snapshots remain, and the routing matrix is not yet full rank. Method 400 may then proceed to step 452.

In step 452, it is determined whether the candidate snapshots should be expanded. Step 452 of method 400 is reached if the candidate snapshots presently available are not sufficient to render the routing matrix full rank. If, for any reason, candidate snapshots are not to be expanded, method 400 may proceed to step 470, as shall be discussed below. Even if available candidate snapshots do not render the routing matrix full rank, the increased rank of routing matrix may be used to provide improved modeling of the traffic of an IP network. If the result of step 452 is the conclusion that candidate snapshots are to be expanded, method 400 proceeds to step 460.

In step 460, the candidate snapshots may be expanded. Step 460 may be omitted from methods in accordance with the present invention. Candidate snapshots may be expanded in a number of ways, some of which are illustrated as substeps in FIG. 4. Not all substeps of step 460 illustrated in FIG. 4 need be used, and substeps not illustrated may also be used. Step 460 may utilize candidate snapshots excluded in step 420 but retained for use if candidate snapshots are to be excluded.

For example, in substep 461, candidate snapshots may be expanded to include snapshots that change two link weights. Subset 461 may further limit snapshots to those that change two adjacent link weights. By changing only adjacent link weights in substep 461, rather than any pair of link weights in the network, the resulting network behavior may be more acceptable, more easily predicted, and more manageable for network operators. Substep 461 may also impose additional constraints, such as requiring that the link weights be set within certain parameters, an example of which is described below. The restrictiveness of substep 461 may vary without departing from the scope of the present invention.

In substep 462, the candidate snapshots may be expanded to include those that change three link weights. By limiting the links for which weights are changed in substep 462 to those that form a triangle in the network, the impact upon network traffic and behavior may be more predictable and manageable for a network operator. Substep 462 may also impose additional constraints, such as requiring that the link weights be set within certain parameters, an example of which is described below. The restrictiveness of substep 462 may vary without departing from the scope of the present invention.

In substep 463, candidate snapshots may be expanded by excluding candidate snapshots based upon more lenient network link weight limits than those imposed in substep 422 of step 420, if substep 422 was employed. For example, if substep 422 limited candidate snapshots to those that altered a weight only within a specified range of the link's weight, substep 463 could expand candidate snapshots to any that comply with minimum and maximum link weight restrictions of the IP network. Substep 463 may even relax link weight constraints beyond those generally applied to the IP network.

In substep 464, candidate snapshots may be expanded by excluding snapshots using a delay limit more lenient than the delay limit imposed in substep 424 of step 420, if substep 424 was used. Substep 464 may even remove delay limits altogether.

In substep 465, candidate snapshots may be expanded by excluding candidate snapshots based upon load limits using more lenient load limits than those imposed in substep 426 of step 420, if substep 426 was employed. Substep 465 may even remove load limits altogether.

While example substeps that may be used to expand candidate snapshots are described herein, other substeps and/or other combinations of substeps may be used to expand candidate snapshots if such an expansion is necessary. Of course, other substeps may be used in step 460 to expand the candidate snapshots by, for example, relaxing or entirely removing limitations placed upon candidate snapshots in prior steps of method 400.

After candidate snapshots have been expanded in step 460, method 400 may return to step 430 of ordering candidate snapshots. Step 430 may serve to order only the new snapshots, or it may reorder all candidate snapshots. Method 400 may thereafter proceed to step 440 of evaluating candidate snapshots, and then continue as described above. Step 440 may evaluate only the new snapshots, or it may re-evaluate all candidate snapshots. It should be noted that if step 460 has already fully expanded candidate snapshots and step 452 is reached again, the method 400 may appropriately determine that there is no further need to seek to expand candidate snapshots, as candidate snapshots have already been fully expanded. However, step 460 may also be used to iteratively and gradually expand candidate snapshots. For example, in the first pass through step 460, only a single substep, such as substep 461, may be employed. If method 400 thereafter returns to step 460 to further expand candidate snapshots, an additional substep, such as substep 462, may be applied to expand candidate snapshots further. Alternatively, on a first pass, step 460 may expand candidate snapshots by applying, for example, a first more lenient set of network parameters, such as link weight limits, delay limits, and load limits, while on a subsequent application apply yet more lenient network parameters. By way of further example, step 460 may first expand candidate snapshots to those that change the weights of adjacent links and then, if necessary, to those that change the weights of triangular links, and then, if necessary, to those that change the weights of two or three links in any configuration. In this fashion, candidate snapshots may be expanded until the IP network's routing matrix is full rank while minimizing the degree to which the candidate snapshots adversely impact the performance of the IP network. One skilled in the art will realize that the gradual expansion of candidate snapshots may be adapted to the specific needs in a particular IP network.

Once method 400 reaches step 470, whether through step 448 or step 452, step 470 proceeds to apply the next candidate snapshot to the link weights of the IP network. If step 470 has been reached for the first time in the application of method 400, the next candidate snapshot to apply will be the first candidate snapshot. Step 470 may apply the snapshots in the order determined by step 430. Method 400 may then proceed to step 472. In step 472, link utilization data is collected for the applied snapshot. Step 482, may determine whether candidate snapshots remain. If candidate snapshots remain, method 400 may return to step 470, in which the next candidate snapshot is applied. If the result of step 482 is that no candidate snapshots remain to be applied, method 400 proceeds to end 490.

One skilled in the art will note that method 200, method 300, and method 400 all provide methods for expanding the routing matrix of an IP network by altering link weights in the network. The expanded routing matrix may be used in further methods in accordance with the present invention to model the traffic matrix. However, the results of method 200, method 300, method 400, or other methods in accordance with the present invention may be utilized to provide additional network information for use with other modeling methods than those hereinafter described, as well. Further examples of applying method 200, method 300, and method 400 shall be described below.

Figure 5:
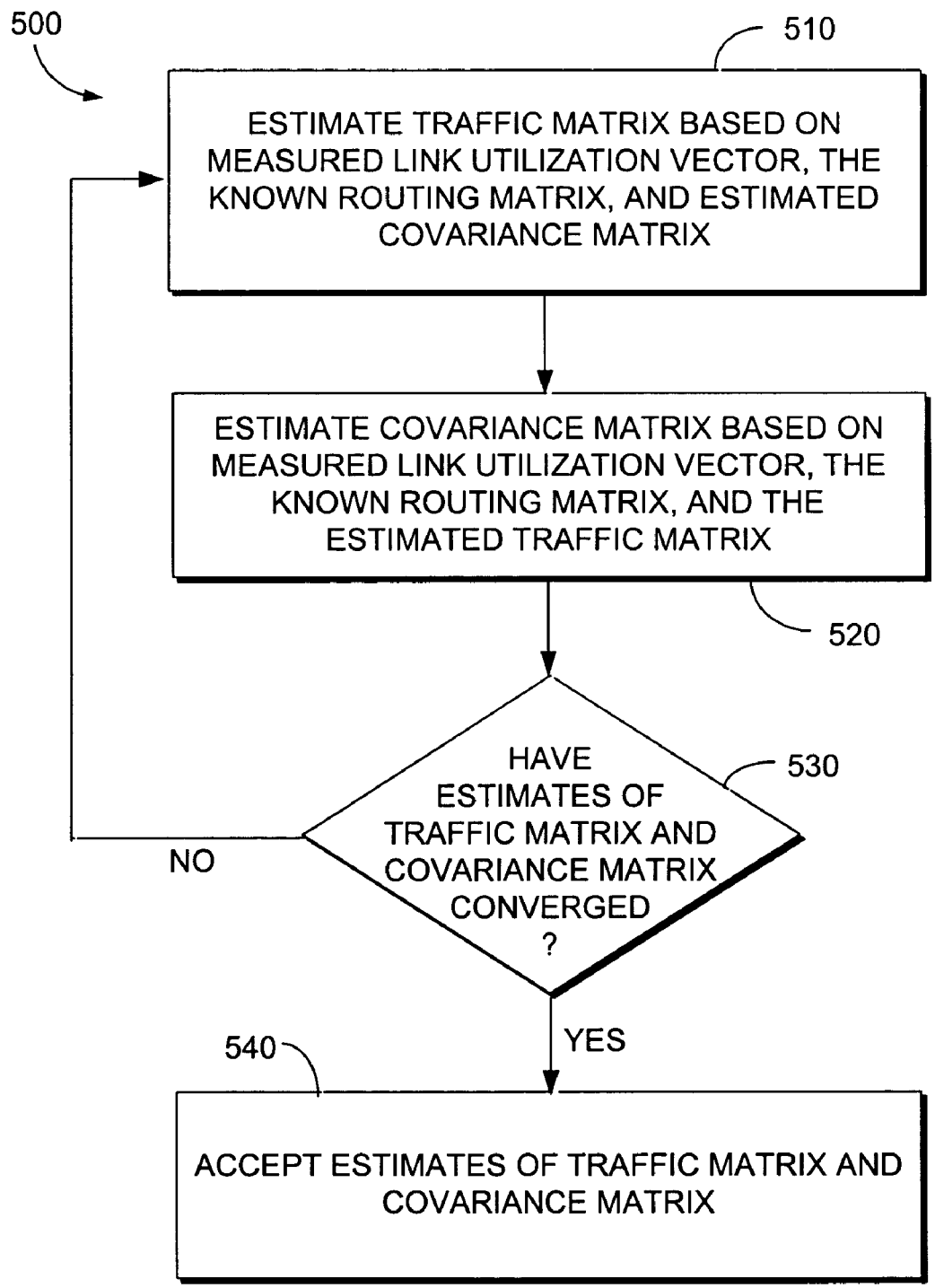
FIG. 5 illustrates a method in accordance with the present invention for modeling the traffic matrix and the variance of traffic in an IP network.

Referring now to FIG. 5, a method in accordance with the present invention for modeling network traffic in accordance with the present invention is illustrated. In step 510, the traffic matrix is estimated based upon the measured link utilization vector, the known routing matrix, and an estimated covariance matrix, with the diagonal of the covariance matrix being the variance. It should be noted that the known routing matrix may be an aggregate routing matrix constructed from multiple routing matrices using different sets of link weights, and that the link utilization vector may likewise be constructed from multiple link utilization vectors, each corresponding to a set of link weights. In the first application of step 510, the covariance matrix may be estimated to be the identity matrix, although various approximations such as a previously calculated covariance matrix may also be used. In step 520, the covariance matrix may be estimated based upon the measured link utilization vector, the known routing matrix, and the estimated traffic matrix. In applying step 520, the estimated traffic matrix may be the value arrived at in the most recent application of step 510. In step 530, it is determined whether the estimates of the traffic matrix and/or the covariance matrix have converged. If the estimates have not converged, method 500 returns to step 510. If the estimates have converged, method 500 proceeds to step 540, and the estimates of the traffic matrix and the covariance matrix are accepted. More particular descriptions of example methods implementing method 500 are described below, as are other methods in accordance with the present invention for estimating the traffic matrix of an IP network. It should be noted that the methods in accordance with the present invention may be employed without regard to how the link utilization values were collected and how the routing matrix of the IP network is rendered full rank. For example, the practice of method 500 does not require that a full rank routing matrix was obtained using method 200, method 300, or method 400.

As described above, method 200, method 300, and method 400 provide a method for increasing the rank of the routing matrix of an IP network, thereby enabling better modeling of the traffic matrix of the IP network. It should be recalled that an IP network may comprise a plurality of links connecting a plurality of nodes. The routing configuration in an IP network may be determined by an IGP routing protocol. In practice, a large IP network may often use a link-state protocol such as ISIS or OSPF for routing within the network. Using such a protocol, every link in the network is assigned a weight, and the cost of a path in the network is measured as the sum of the weight of all links along the path. Traffic may be routed between any two nodes along the shortest route path, also referred to as the minimum cost path, with the minimum cost path being computed using an algorithm such as Dijkstra's shortest path algorithm.

As described above, the traffic observed on each link may be the aggregation of traffic between one or more origin-destination node pairs for which the shortest path route includes that link. As described above, the relationship between the traffic matrix, the routing matrix, and the link counts can be described by a system of linear equations $Y=AX$ where Y is the vector of link counts, X is the traffic matrix organized as a vector, and A denotes a routing matrix, in which element $a_{ij}$ is equal to one if origin-destination node pair j traverses link i and is zero otherwise. If the IP network allows traffic splitting, the elements of the routing matrix can take on fractional values. Often, the system $Y=AX$ is underconstrained because the routing matrix A is of less than full rank, thereby preventing a solution for the traffic matrix X from being obtained.

If a link weight is changed in the network, traffic between some of the origin-destination pairs on that link could be moved onto other paths. SNMP protocols may be used to measure link utilization before and after such a change. Analysis of the SNMP link utilization data under different routing conditions may decrease the ambiguity inherent in link measurements. As described above, the term snapshot may be used to denote different routing configurations in the IP network, with each snapshot having its own set of link weights. As a result, the routing matrix, denoted A, may vary for snapshot k, and snapshot $k_2$. For the first snapshot, the routing matrix associated with it is $A(k_1)$. For the second snapshot, the associated routing matrix is $A(k_2)$. Each subsequent snapshot would likewise have an associated routing matrix. The rank of two or more matrices, such as routing matrices for different snapshots, may be greater when considered together than the rank of the original matrix. This expansion of rank would happen if some of the new link counts generated equations that were linearly independent of those in the original system. By repeatedly changing link weights, sufficient independent equations may be generated to have a full rank routing matrix.

This approach of modifying link weights in snapshots and systematically applying snapshots may be applied in a variety of fashions. The example further described below is one method in accordance with the present invention for obtaining a full link routing matrix by altering link weights. Other methods, such as methods that do not impose performance constraints upon the snapshots or that do not order the snapshots, may also be used without departing from the scope of the present invention. To adapt a method in accordance with the present invention for application in an existing IP network, however, it may be necessary to limit snapshots to those that do not exceed certain network parameters, some examples of which are described further below. In such fashion, only snapshots deemed suitably safe for network operation may be applied to the IP network.

An IP network may be represented by an undirected graph $G(\mathcal{N}, \mathcal{L})$ where $\mathcal{N}=\{1, \ldots, N\}$ corresponds to the set of nodes, and $\mathcal{L}=\{l_1, \ldots, l_L\}$ corresponds to the set of links connecting the nodes. A propagation delay $d_h$ and an integral link weight $w_h$ may be associated with each link within the network. $\mathcal{W}=\{w_q, \ldots, w_L\}$ may be the initial set of link weights within the network. $\mathcal{P}=\{p_1, p_2, \ldots, p\mathcal{P}\}$ may denote the set of origin-destination pairs flowing across the network. Traffic between each origin-destination node pair may be routed along the minimum cost path between the origin node and destination node with an end-to-end delay $d_p$ equal to the sum of the propagation delays of each link along the path. If there are multiple equal length minimum cost paths between an origin and a destination node, the traffic may be split evenly across all the equal path links if traffic splitting is permitted in the IP network. The nominal traffic matrix may be represented as a column vector $X=(X_1, X_2, \ldots, X\mathcal{P})^T$, where $X_p$ represents the volume of traffic generated for the origin-destination pair p during a measurement interval.

The routing in the IP network using snapshot k is described by routing matrix $A(k)$, which is an L×P matrix. Specifically, the element of $A(k)$ in the $l^{th}$ row and the $p^{th}$ column is defined as the fraction of traffic for the origin-destination pair p that is routed on link l under snapshot k. For example, if all of the traffic for an origin-destination pair p is routed along link l, then $A(k)_{lp}=1$. If there are two shortest paths between an origin and destination node pair and link l is in one of those paths, then $A(k)_{lp}=\frac{1}{2}$. If no traffic for an origin-destination pair P is routed along link l, then $A(k)_{lp}=0$ The traffic generated by every origin-destination node pair may be stationary or nonstationary from one snapshot to the next. While the modeling of a traffic matrix may be different, depending upon whether data is stationary or nonstationary, the method for identifying and applying such snapshots may be the same whether data is stationary or nonstationary.

In an operating IP network, there may be a working set of link weights that may be referred to as a snapshot zero. In accordance with the present invention, a set of k snapshots 1, 2, ..., k are synthesized, such that corresponding link measurement vectors $Y(0), Y(1), \ldots, Y(K)$ completely determine the traffic matrix.

The link measurement vectors $Y(k)$ may be stacked into an aggregate link measurement column vector Y. Likewise, the routing matrices $A(k)$ may be stacked into an aggregate routing matrix A, i.e. $A=[A^T(0), A^T(1), \ldots, A^T(K)]^T$. Using this notation, $Y=AX$. If the aggregate routing matrix A has full rank, then the traffic matrix X can be fully determined by measurement of Y.

While a variety of approaches may be used to identify and apply snapshots until a full rank aggregate routing matrix is obtained, in an operating IP network the network operator may desire to avoid applying snapshots that will exceed certain network operating parameters, such as, for example, an average connection delay in excess of predetermined limits. In an operational IP network, link weights may be changed only infrequently. The operator of an IP network may prefer not to move the network too far away from an established acceptable operating configuration. Furthermore, changing link weights may require modifications to multiple routers in the network, and the difficulty of implementing a link weight change may increase as the number of links changed increases. A snapshot that falls outside of these or other acceptable parameters may be excluded. The exclusion may be temporary, meaning that the snapshot may be used if applying only acceptable snapshots will not result in a full rank routing matrix, or may be permanent.

By way of example, suppose that there are L links in an IP network. The network operator may require a predefined minimum link weight $W_{min}$, and a predefined maximum link weight, $W_{max}$. Weights may only take on an integral value in many networks, and thus the number of possible weight settings for a single link is $W=W_{max}-W_{min}$. A single snapshot corresponds to a set of L link weights, and thus the number of possible snapshots could be $2^{(W^L)}$, which for most working IP networks is an enormous number.

A method in accordance with the present invention may begin by identifying a set of snapshots that involve a weight change on a single link. From there, candidate snapshots may be further limited to those which will result in a change in the routing for at least one origin-destination node pair. Such snapshots may not all meet operational parameters such as load and delay limits, so the candidate snapshots may be further reduced to those which comply with predetermined operating parameters. Since the number of possible snapshots remaining may be very large, these snapshots may then be ordered for further evaluation. One method for ordering candidate snapshots using a ranking function is described below. This ordering of snapshots may be applied to build an aggregate routing matrix by adding snapshots that will increase the rank of the aggregate routing matrix until the aggregate routing matrix has full rank. If the candidate snapshots do not result in a full rank routing matrix, further snapshots may be considered which involve changing multiple link weights, such as pairs or triplets of links, or that would violate the initial predetermined operating parameters. One example of a method in accordance with the present invention using six steps is described below.

Step one may comprise pruning by route mapping. In this step, a set of snapshots may be identified, where each snapshot corresponds to a weight change on a single link. Let $\Delta_h' = \{\delta w_h(p_1), \ldots, \delta w_h(p\mathcal{P})\}$ be the set of potential weight perturbations to apply to a given link $l_h$. Recall that P is the number of origin-destination node pairs in the network. For each link $l_h \in \mathcal{L}$, the set $\Delta_h'$ may be determined as follows.

First, for an origin-destination node pair p, let $\theta_0(p)$ be the path length of the minimum cost path from the origin node of p to the destination node of p under the initial set of link weights $\mathcal{W}$. Let $\theta_h(p)$ be the length of the shortest path which is constrained to use link $l_h$. More precisely, let the origin and destination nodes of p be s and t, respectively, and let the initial and terminal nodes of link $l_h$ be X and y. With this notation, $\theta_h(p) = d_{sX} + w_h + d_{yt}$, where $d_{sX}$ is defined as the length of the shortest path from node s to node X and $d_{yt}$ is the length of the shortest path from node y to node t. By definition of $\theta_0(p)$, for any link $l_h \theta_0(p) - \theta_h(p) \leq 0$. Furthermore, if $\theta_0(p) - \theta_h(p) < 0$ and the link weight of $l_h$ is changed from $w_h$ to $w_h + \theta_0(p) - \theta_0(p)$, then under the new set of link weights, the shortest path for origin-destination node pair p will pass through link $l_h$. It should be further noted that there may be more than one shortest path for the origin-destination node pair p, in which case all traffic for the pair may be split evenly across all such paths if path splitting is allowed in the IP network. If there is only one shortest length path including $l_h$ for the origin-destination node pair P, then $\theta_0(p) - \theta_h(p) = 0$ and changing the weight of link $l_h$ from $w_h$ to $w_h - 1$ will result in all traffic for the origin-destination pair p being routed over link $l_h$. Based upon these observations, for each $l_h$ and p, define $\delta w_h(p) = \theta_0(p) - \theta_h(p)$ if $\theta_0(p) - \theta_h(p) < 0$ and $\delta w_h(p) = -1$ if $\theta_0(p) - \theta_h(p) = 0$ and link $l_h$ lies along the exactly one shortest path for origin-destination node pair p. Recalling that any link weight change must result in a new weight that lies within the range of $W_{min}$ and $W_{max}$, the set of link weight perturbations for link $l_h$ may be pruned to the set $\Delta_h$ where $\Delta_h = \{\delta w_h(p): \delta w_h(p) < 0 \text{ and } w_h + \delta w_h(p) \in [W_{min}, W_{max}], \forall p \in \mathcal{P}\}$ After considering all possible links $l_h$ within the network, a set of possible snapshots $$\Delta = \bigcup_{h=1}^{L} \Delta_h$$

may be obtained, each of which corresponds to a single link weight change that results in traffic from an origin-destination node pair being moved on at least one link. This subset of candidate snapshots may be significantly less than the total possible snap shots, meaning that there may be a significant savings over considering all possible single weight changes.

It should be noted that there are multiple ways to generate the set of candidate snapshots. One way would be to apply any possible weight on any link. In that case, for any link $l_h \in \mathcal{L}$ there would be $W = W_{max} - W_{min}$, possible solutions. Then, $$|\Delta| = \sum_{h=1}^{L} |\Delta_h| = WL.$$

Another approach would be to attempt to force any origin-destination node pair on each possible link. Then $$|\Delta| = \sum_{h=1}^{L} \Delta_h = PL/2,$$

since the routing used by origin-destination node pair s→d is the same as the route used by d→s. The first approach would generate a number of solutions proportional to the cardinality of the weight allowed, while the second generates a number of solutions that is proportional to the cardinality of the origin-destination node pairs. If the purpose is to disaggregate a specific subset of origin-destination node pairs, the second method requires the generation of fewer solutions. Also, IP network operators are likely to eventually increase the number of bits used to encode a link weight from six to eight, making the cardinality of $\mathcal{W}$ increase from sixty-four to two hundred fifty-six, in which case the second of these two example approaches may be expected to generate many fewer candidate solutions, thereby reducing the complexity of the method. However, either of these two approaches, or other approaches, may be used.

In step two candidate snapshots may be pruned by performance constraints. Performance constraints may be operating parameters such as delay limits and load limits. All of the candidate snapshots in the set $\Delta$ may be examined to build a set of candidate snapshots as a set of tuples $S = \{(l_h, w_{hi})\}$, where each tuple represents a deviation from the original weights set by setting the weight of the link $l_h$ to the value $w_{hi}$, defined as $w_{hi} = w_h + \Delta w_h(p_i)$. For each tuple, the associated routing matrix $A_{hi}$ may be computed. For each candidate snapshot, the new average end-to-end delay for all origin-destination node pairs may be computed. If this result violates a predetermined delay limit the snapshot may be excluded. If the snapshot meets the delay constraint and there is an available traffic matrix $X_{old}$ from prior modeling, then this traffic matrix may be used on the new topology to compute a prediction of the resulting link loads by calculating the matrix product $A_{hi} X_{old}$. If any of the resulting link loads violate a predetermined load limit, then the snapshot may also be excluded. Snapshots excluded may be retained for future consideration, for example if the snapshots need to be expanded to obtain a full rank routing matrix. For example, excluded snapshots and their associated routing matrix may be maintained in a temporary storage locations.

It should be noted that it is possible for different weight perturbations to have the same net impact on the routing of the IP network. Therefore, for those snapshots that are within both the delay and load limits, the snapshots may be included only if the corresponding routing matrix is not identical to the routing matrix for another included snapshot. In this manner, redundant snapshots may be avoided.

In step three the candidate snapshots may be ordered. All possible subsets of candidate snapshots could be considered with the rank of the associated aggregate routing matrix computed for each subset of snapshots. However, since the number of subsets may be very large this could be computationally prohibitive in many circumstances. Instead, in this step the candidate snapshots may be ordered for future evaluation based upon the amount of network traffic information each snapshot is likely to provide.

A ranking function may be defined for application to each snapshot. The ordering among the snapshots may then be performed according to the ranking function, with the highest ranking snapshots at the top of the order. While an example ranking function is described below, other ranking functions would be used as well.

The objective of the ranking function may be to identify the snapshots that appear to be the most promising, in that they will likely result in a large increase in the rank of the aggregate routing matrix. Suppose that a given perturbation moves exactly one origin-destination node pair off of some link and on to link $l_h$. In this case, the perturbation determines the traffic volume for that origin-destination node pair exactly, its value being the difference between the link count on $l_h$ before and after the change. Since a single weight change can move multiple origin-destination node pairs, it is possible to learn more than one origin-destination node pair exactly in one weight change event. Once an origin-destination node pair is known exactly, it may be referred to as a well-known origin-destination node pair. The goal of constructing the present ranking function is to reflect the impact on the number of newly well-known origin-destination node pairs created by the snapshot, as well as a general measure of the amount of information gained in implementing snapshot. An example of one possible ranking function is described below.

In defining the ranking function, let $\Gamma_{hi}$ be the set of origin-destination node pairs whose routing is effected by changing the link weight on $l_h$ to the new value $w_{hi} = w_h + \Delta w_h(p_i)$. Let $\beta_{hi}(p)$ be a primary variable that is equal to one if the origin-destination node pair p uses the link $l_h$ and zero otherwise, with respect to the new set of link weights after changing the link weight of $l_h$ to $w_{hi}$, as described above.

For a link $l_h$ which belongs to a new link on a path for an origin-destination node pair $p_t$ after the link weight change, consider the sum $\Sigma_{p \in \Gamma_{hi}/p_t} \beta_{hi}(p)$. This sum counts all the origin-destination node pairs moved onto link $l_h$ other than $p_t$ at the same time $p_t$ is moved. If this sum is zero, then only $p_t$ has been moved on link $l_h$. Let $R_{hi}(p_t)$ be the set of new links along the path used by origin-destination node pair $p_t$ after applying the weight $w_{hi}$, which is to say the set of links that are contained in a shortest path for $p_t$ after changing the link weight $w_h$ to $w_{hi}$ but are not included in any shortest path for $p_t$ for the original set of weights $\mathcal{W}$. The ambiguity of $p_t$ after the weight change $(l_h, w_{hi})$ may be defined as $$m_{hi}(p_t) = \min_{l_h \in R_{hi}} \sum_{p \in \Gamma_{hi}/p_t} \beta_{hi}(p)$$

$$\forall w_{hi}:(l_h, w_{hi}) \in S$$

This definition takes the minimum of these per-link sums across all the new links in the new path of the origin-destination node pair $p_t$. If $m_{hi}(p_t) = 0$ then $p_t$ becomes a well-known origin-destination node pair. This can be viewed as a measure of disaggregation. For example, a value of $m_{hi}(p_t) = 2$ means that two origin-destination node pairs, including $p_t$, have been disaggregated from their original bundling and moved to link $l_h$.

The quantity $m_{hi}(p_t)$ may be defined for a single origin-destination node pair $p_t$. A metric may be defined over all origin-destination node pairs affected by changing the link weight of $l_h$ to the value $w_{hi}$, the metric being $$M_{hi} = \sum_{p_t \in \Gamma_{hi}} (1/(Bm_{hi}(p_t) + 1))$$

$$\forall w_{hi}:(l_h, w_{hi}) \in S.$$

In the above, B is a large parameter. It should be noted that if $m_{hi}(p_t) = 0$ for all $p_t$ affected by the weight change event $(l_h, w_{hi})$ then $M_{hi}$ is equal to the number of well-known origin-destination node pairs. Further note that for all $p_t$ which are not well known as a result of weight changes on link $l_h$ then $m_{hi}(p_t) \geq 1$ and there are at most P such origin-destination node pairs. Thus, if B is large enough so that $P/(B+1) < 1$, then a single newly well known origin-destination node pair is weighted more in the metric than all the terms which measure how much information is gained for origin-destination node pairs which do not become well known.

For example, suppose there are two weight changes to compare, $w_1$ and $w_2$. The first change $w_1$ moves only one origin-destination node pair $p_1$, but in a way that it can be known exactly. In this case, $m_{w_1}(p_1) = 0$. The second change moves three origin-destination node pairs $p_1$, $p_2$, and $p_3$, but none of them can be completely isolated from the others. If each link is shared by two origin-destination node pairs that were rerouted, then $m_{w_2}(p_1) = m_{w_2}(p_2) = m_{w_2}(p_3) = 1$. Without the B factor, $w_2$ would produce a value of $M_{w_2} = 1.5$. Because this is greater than $M_{w_1} = 1$, it would make snapshot $w_2$ more attractive than $w_1$. However, if it is considered better to know something exactly than simply to get new link counts without any complete disaggregation, this is the reverse of what is desired. By using a large B factor, the proposed snapshot $w_1$ will achieve a higher priority than $w_2$ since $M_{w_2} \ll M_{w_1}$. The snapshots are then ranked according to the corresponding value of $M_{hi}$ for each snapshot, where the snapshot with the largest value of $M_{hi}$ is at the top of the list.

In step four the candidate single link snapshots may be evaluated. The snapshots may be evaluated in the order defined in step three, described above. This evaluation may be done by determining whether or not each snapshot increases the rank of the routing matrix obtained so far. If $A_O$ denotes the initial routing matrix based on the original set of weights, and if A denotes the improved aggregate routing matrix after usable snapshots have been appended, then when the process is completed A will be the final aggregate routing matrix with the routing matrix for each included snapshots appended. Each entry $(l_h, w_{hi}) \in S$ may be evaluated sequentially by appending its associated routing matrix $A_{hi}$ to A and computing the rank of the combined routing matrix. The snapshots may be considered in the order determined in step three, with a highest ranking snapshots evaluated first. Only if the rank A increases is $A_{hi}$ kept in A, otherwise the snapshot is discarded. The evaluation may stop when the rank of A is equal to P, meaning that the routing matrix is full rank. If all the candidate snapshots are evaluated and the rank of A is still less than P meaning less than full rank, the example method may proceed to step five.

In step five multiple weight changes may be considered. In large networks performing only single link weight changes may not be enough to guarantee that a full rank routing matrix will be obtained. Accordingly, in step five of the present example simultaneous changes of either two or three link weight changes may be considered. While more than three link weight changes in a single snapshot could be considered, in many cases IP network operators may be hesitant to employ more than three weight changes at a single time due to the uncertain results of simultaneously applying such a large number of weight changes to an IP network.

In step five snapshots that would change pairs of link weights may first be considered. For each snapshot, the pair on links may be required to be adjacent. A pair of links may be considered to be adjacent if the incident to a common node. For each pair of adjacent links, possible link weight changes may be limited to only two weight changes, such as changing the weight of both links to $W_{min}$ or changing both weights to $W_{max}$. This limitation while not necessary, may simplify the use of a method in accordance with the present invention. For each resulting snapshot, the delay limit and load limit constraints may be checked. If the delay limit and load limit constraints are met, the snapshot may be evaluated to determine whether it would increase the rank of the resulting aggregate routing matrix and, if so, the snapshot may be included in the list of snapshots and the aggregate routing matrix may be updated accordingly. If the aggregate routing matrix is still not full rank, additional snapshots changing a pair of adjacent link weights as described above may be considered. This process may continue until all possible snapshots of adjacent pairs of links have been considered.

If all snapshots corresponding to changing pairs of link weight changes as described above are exhausted, and the rank of the aggregate routing matrix has not yet reached P, then snapshots corresponding to changes of three link weights may be considered. To simplify the process, one may consider only triplets of links that form triangles in the IP network i.e., triplets of links in the form {(a,b),(b,c),(c,a)}. The process may be further simplified by considering only triplet of link changes though all weights are changed to either $W_{min}$ or to $W_{max}$. As with changes to pairs of link weights, this limitation is not necessary, but may simplify the use of a method in accordance with the present invention. For each such snapshot, the delay limit and load limit constraints may be checked. If the load limit and delay limit constraints are satisfied, the corresponding routing matrix may be examined to determine whether the aggregate routing matrix is increased in rank. If the rank of the aggregate routing matrix would be increased, the snapshot may be added to the list and the aggregate routing matrix updated accordingly. If the aggregate routing matrix is still not full rank, further snapshots changing triplets of links in this fashion may be considered. The process may continue until the aggregate routing matrix has full rank or all snapshots corresponding to triplets of link weight changes are exhausted.

In step six the example method may continue by relaxing performance constraints if the aggregate routing matrix is still not full rank. In step six the delay and load constraints may be relaxed. For example, the delay constraint may be removed all together and the load constraint may be increased to, for example, ninety percent of link capacity. The set of candidate snapshots considered at this point may be those that were set aside earlier. This set will include snapshots that pass the pruning of step one but failed the pruning of step two. With this set, the method of step two may be performed again with modified performance constraints through step three and step four.

In practice, it is expected that the use of example method through step six, if necessary, will result in a full rank routing matrix for all, or at least most, existing IP networks. Even if a full rank routing matrix cannot be obtained in accordance with the present example method, the additional information provided using this example method or other methods in accordance with the present invention will greatly enhance the modeling and forecasting of network traffic in an IP network.

Once a full rank routing matrix is obtained, whether by using one of the above described example methods, other methods in accordance with the present invention, or through other means, the traffic matrix may be estimated using the full rank routing matrix and the collected link utilization data. Further methods in accordance with the present invention, examples of which are described below, are useful for estimating the traffic matrix.

Even with a full rank linear system, the problem of traffic matrix estimation is not entirely solved. In fact, the process of obtaining multiple sets of link measurements over disparate time intervals means that the dynamic nature of traffic must be contended with. It may be that measurements have been taken during a time period where network traffic is essentially stationary, but the traffic matrix also could be in a non-stationary regime. A methodology in accordance with the present invention may be used to estimate traffic matrices under any fluctuating environment, whether stationary or non-stationary. The example methods of estimating a traffic matrix described below assume that a full rank routing matrix is available. Whether the full rank routing matrix is obtained using a method such as those described above or through some other means is immaterial to the methods of modeling a traffic matrix in accordance with the present invention.

In methods of estimating a traffic matrix in accordance with the present invention, each origin-destination node pair may be modeled in time by two components, its mean value and its traffic fluctuation. By modeling these components separately, the model may readily be extended to both stationary and non-stationary scenarios. The methods in accordance with the present invention assume only that the fluctuations process is zero mean. The methods in accordance with the present invention provide closed form estimates for the first and second order moments of a traffic matrix for both stationary and non-stationary environments. Second order moment refers to the entire covariance structure. The covariance is estimated directly in accordance with the present invention because it is hard to know the relationship between mean and variance exactly, and a relationship may change over time as traffic patterns evolve. The methods in accordance with the present invention are able to explicitly compute the variance of the error for each origin-destination node pair. This enables the carrier to know which of the origin-destination node pairs are likely to have the largest errors.

In formulating the traffic demand estimation problem, consider a network represented by a collection of $\mathcal{N}=\{1, 2, \ldots, N\}$ nodes. Each node may represent a set of co-located routers in a PoP, although other levels of abstraction may be used as well. A set of L directed links $\mathcal{L} \subset \mathcal{N} \times \mathcal{N}$ is also given. Each link may represent an aggregate of transmission resources between two PoPs, although other levels of abstraction may be used as well. It is assumed that there are no self directed links, meaning there are no links l in the form of l=(i,i). A finite time horizon consisting of K disjoint measurement intervals may be considered, indexed from 0 to K−1. For simplicity, it may be assumed that measurement intervals are of equal time duration, but this requirement may be relaxed. Each node is a source of traffic which is routed through other nodes, ultimately departing the network. Consider an origin-destination node pair p, and let $X_p(k)$ be the amount of traffic associated with the origin-destination node pair during the measurement interval k. $X_p(k)$ is the amount of traffic originating from node $n_1$ that departs the network at node $n_2$ during measurement interval k. It may be assumed that the measurement interval is long enough that traffic stored in the network may be ignored. Let $\mathcal{P}$ denote the set of all origin-destination node pairs. There is a total of $|\mathcal{P}|=P=N^2-N$ origin-destination node pairs. The origin-destination node pairs p may be ordered to form a column vector X(k) whose components are $X_p(k)$ in some predefined order.

Let $Y_l(k)$ be the total volume of traffic which crosses a link $l \in \mathcal{L}$ during measurement interval k. The links may be ordered in a form of a column vector whose components are $Y_l(k)$ for all $l \in \mathcal{L}$. Let $A_{l,p}(k)$ be the fraction of traffic from node pair p that traverses link l during measurement interval k. Thus $Y_l(k) = \Sigma_{p \in \mathcal{P}} A_{l,p}(k) X_p(k)$. Forming the L×P matrix A(k) with elements $\{A_{l,p}(k)\}$, the result in matrix notation is: Y(k)=A(k)X(k), k=0, 1, ..., K−1. The Y(k) vector may be called a link count vector, and A(k) may be called the routing matrix. In IP networks, the routing matrix A(k) during each measurement interval k may be obtained by gathering topological information and the link weights. The link counts Y(k) may be obtained by measuring link utilization values, for example by using SNMP data.

The link weight changes may be different for each different k, so the routing matrices for $A(k_1)$ and $A(k_2)$ may be different. In fact, it is desirable that the two matrices be sufficiently different so that the rank of the new aggregate routing matrix $A=[A^T(k_1), A^T(k_2)]^T$ is larger than the rank of either matrix alone.

It should be noted that instead of estimating X(k) for each k, methods in accordance with the present invention may attempt to estimate the statistical mean of X and the covariance of X(k). This means that the sum of the estimates for all origin-destination node pairs that cross a given link l are not required to be equal to the link measurement value $Y_l(k)$. The difference between $Y_l(k)$ and the sum of the corresponding estimates may be accounted for by traffic fluctuations. As a practical matter in application, methods in accordance with the present invention may be directed mostly to traffic prediction, meaning that the mean value denoted E[X(k)] may be more important than the value of X(k).

It should be noted that traffic dynamics may have an impact on the traffic matrix estimation problem. There is a strong periodicity in traffic at intervals of twenty-four hours, as would be expected due to work and play habits of Internet users. These are the expected diurnal patterns. In most IP networks, it is likely that traffic over a multi-hour period fluctuates, and that the mean itself is shifting. Thus the traffic matrix may not be stationary over multi-hour periods.

If all sets of measurements are collected within a period when the traffic matrix is stationary, there are still fluctuations within the stationary regime. Optimally, these fluctuations should be explicitly modeled in an estimation method. If all sets of measurements are collected over a period of many hours, it is known that traffic may likely not be stationary. A traffic matrix estimation method should preferably include a model for non-stationary. If used to obtain a full rank routing matrix, a method of deliberately changing link weights to force changes in the routing of the IP network could involve changing link weights at the same time each day, or it could involve changing link weights over a sequence of continuous hours. In the former method, the traffic could be said to be stationary, but in the latter the traffic would not. The advantage of taking measurements at the same time each day is that the estimation procedure is simpler, but this will yield only a traffic matrix for that short time period. The advantage of taking measurements over consecutive periods is that all of the traffic matrix behavior is captured, but the estimation may be more complex. Either approach is acceptable in accordance with the methods of the present invention.

Each image of routing under a given set of link weights may be called a snapshot, with each snapshot having its own routing matrix. Within each snapshot, the set of all link counts collected may be called a sample. Within each snapshot, multiple samples may be collected.

The first example of a method in accordance of the present invention described in detail herein is for a stationary traffic scenario. This scenario assumes that $\{X(k):k=0, 2, \ldots, K-1\}$ is a realization of a segment of a stationary discrete time random process. In particular, it is assumed that X(k)= X+W(k), K=0, 1, ..., K−1, where $\{W(k)\}$ are zero mean column vectors, meaning that E[W(k)]=0. The discrete time random process $\{W(k)\}$ represents the traffic fluctuation for the origin-destination node pairs. $W_p(k)$ may be defined as the $p^{th}$ component of W(k).

In practice, for each measurement interval k there may be missing link measurements due, for example, to collection errors, human errors, or other problems. In addition, depending upon network topology and the routing in measurement interval k, some equations may be redundant, that is linearly dependent. For convenience, the missing or redundant rows of the matrix equation may be deleted to obtain a set of reduced equations, Y'(k)=A'(k)X(k), k=0, 1, ... K−1 where Y'(k) is the $M_k \times 1$ column vector obtained from Y(k) by eliminating the missing or redundant rows, and where A'(k) is obtained by deleting the same rows from A(k).

By definition, rank $(A'(k))=M_k$. Typically $M_k<P$, so it is not possible to infer the value of X(k) from Y'(k), even if there are no missing links measurements. It is assumed that the routing can change during different measurement intervals, so it is possible that $A(k_1) \neq (k_2)$ if $k_1 \neq k_2$.

In accordance with the present invention, the following matrices may be defined, using block matrix notation:

$$Y = \begin{bmatrix} Y'(0) \\ Y'(1) \\ \ldots \\ Y'(K-1) \end{bmatrix}, A = \begin{bmatrix} A'(0) \\ A'(1) \\ \ldots \\ A'(K-1) \end{bmatrix}, W = \begin{bmatrix} W(0) \\ W(1) \\ \ldots \\ W(K-1) \end{bmatrix},$$

and $$C = \begin{bmatrix} A'(0) & 0 & \ldots & 0 \\ 0 & A'(1) & \ldots & 0 \\ \ldots & \ldots & \ldots & \ldots \\ 0 & 0 & \ldots & A'(K-1) \end{bmatrix}.$$

In terms of dimensions, it should be noted that Y is an M-dimensional column vector, where $$M = \sum_{k=0}^{K-1} M_k,$$

A is M×P dimensional matrix, W is a KP-dimensional column vector, and C is an M×KP matrix. Based upon the above definitions, Y=AX+CW.

The vector X, which is the traffic matrix, represents the volume of traffic exchanged between an origin node and a destination node, and the aim of the method is to estimate X from the observations of Y(1), Y(2), ... Y(K). This estimate of X can be used as an estimate of X for future time intervals. The estimate of X may be denoted by $\hat{X}$.

One possible approach for synthesizing an estimate of $\hat{X}$ is to minimize the Euclidean norm of Y−Az, in which case the estimate of X would be $$\hat{X} = \underset{z}{\operatorname{argmin}}\{(Y - Az)^T(Y - Az)\}.$$

The solution of this optimization problem is known as the pseudo-inverse of A, and is given by $\hat{X}=(A^TA)^{-1}A^TY$. Since it is assumed that the matrix A has full rank (P), this ensures that the square matrix $A^TA$ is positive definite and thus of full rank, and hence invertible. Thus the pseudo-inverse is well defined.

While the above provides an estimate for X that may be useful for modeling the traffic matrix of an IP network, it does not provide an estimate of the covariance of the traffic of the IP network. To estimate the traffic of the IP network and the covariance of the traffic, the traffic may be expressed as a function of the covariance and the covariance expressed as a function of the traffic, with each estimated iteratively until the estimates converge. While using the above pseudo-inverse estimate does not require knowledge of the statistics of W, knowledge of the statistics of W can be used to improve the estimate of X. For example, the components of Y may have different variances. For example, if the variance of a component of Y is small, the square of the difference between that component and the corresponding component of $A\hat{X}$ should be heavily weighted in the determination of an estimate of X. To this end, B may be defined as the covariance matrix of W, meaning that $B=E[WW^T]$. With this definition the covariance vector of Y is equal to $CBC^T$.

Of course, B is initially unknown. The iterative estimation process can begin, however, by assuming that B is known. Based upon this assumption, the traffic matrix x can be solved as a function of B and known quantities, such as link utilization and the routing matrix.

The best linear estimate of X given Y, in the sense of minimizing $E[(Y-Az)^T(Y-Az)]$ with respect to z is known as the best linear Minimum Mean Square Error estimator, often referred to as the MMSE. The best linear MMSE estimate of X can be obtained from the Gauss-Markov theorem. The best linear MMSE estimator $\hat{X}$ of x given Y is $\hat{X}=\hat{X}(Y,B)=(A^T(CBC^T)^{-1}A)^{-1}A^T(CBC^T)^{-1}Y$. Note that the estimate $\hat{X}$ in the above reduces to the pseudo inverse estimate when $CBC^T$ is the identity matrix. If W has a Gaussian distribution, it can be verified that this estimate is in fact the maximum likelihood estimate of X.

Regardless of whether or not W is Gaussian, the estimate above is unbiased, in that $E[\hat{X}]=X$, and furthermore that $\hat{X}(Y,B)=X+(A^T(CBC^T)^{-1}A)^{-1}A^T(CBC^T)^{-1}CW$ and $E[(\hat{X}-X)(\hat{X}-X)^T]=(A^T(CBC^T)^{-1}A)^{-1}$. Note that this allows an estimate of the accuracy of the estimate of $\hat{X}$ given Y and B. In particular, the $p^{th}$ element of the diagonal of the matrix $E[(\hat{X}-X)(\hat{X}-X)^T]$ is the mean square error of the estimate of the $p^{th}$ element of the traffic matrix. Now, $\hat{X}=(A^T(CBC^T)^{-1}A)^{-1}A^T(CBC^T)^{-1}Y=(A^T(CBC^T)^{-1}A)^{-1}A^T(CBC^T)^{-1}(AX+CW)=(A^T(CBC^T)^{-1}A)^{-1}A^T(CBC^T)^{-1}AX+(A^T(CBC^T)^{-1}A)^{-1}A^T(CBC^T)^{-1}CW=X+(A^T(CBC^T)^{-1}A)^{-1}A^T(CBC^T)^{-1}(CW)$. Since W is zero mean, this also proves that $\hat{X}$ is unbiased. Having expressed X as a function of B, X may now be estimated using measurements for vector Y and assuming B takes on a known value. The resulting estimate of the mean may then be used to estimate the variance. This process may be iterated until the estimate of the mean converges.

The initial estimate in the estimation of X uses the measurement vector Y and the routing matrices A and C. It also begins with the assumption that B=I, I being the identity matrix. Thus the initial estimate of X is simply the pseudo-inverse estimate, i.e. $\hat{X}^{(0)}=\hat{X}(Y,I)$. Given this initial estimate of X, this estimate may be used to form the first estimate of B. This estimate of B can then be used to form an updated estimate of X. In general, this creates the recursion $\hat{X}^{(k+1)}=\hat{X}(Y,\hat{B}(\hat{X}^{(k)}))$. The final estimate then consists of the convergent value of this recursion, if the limit exists, which is the solution z to the fixed point equation $z=\hat{X}(Y,\hat{B}(z))$.

In the above example, there remains the issue of estimating B as a function of X. When estimating the variability of traffic between origin-destination node pairs over time, the confidence intervals for the estimate of $\hat{X}$ may be defined. To this end, the problem of estimating the second order statistics of the fluctuation process {W(k)} may be considered, which is an attempt to estimate the covariance matrix B. Two example methods of estimating the covariance matrix B are described below. Both of these estimation methods assume that the mean traffic matrix is known, and employs the estimate $\hat{X}$ of X previously obtained for the traffic matrix to yield an estimate of B.

Consider the vector Y−AX, which is a known vector if Y and X are known. A random KP×KP matrix Z may be defined such that $Z=B-WW^T$. By the definition of B, Z has zero mean. Accordingly, $(Y-AX)(Y-Ax)^T=(CW)(CW)^T=CWW^TC^T=CBC^T+CZC^T$.

In the first example method, it is assumed that the covariance matrix B may be expressed as a linear function of a parameter vector r, meaning that B=B(r). For example, it may be assumed that the traffic fluctuations for different origin-destination node pairs are uncorrelated and that the traffic fluctuations are uncorrelated in time for each origin-destination node pair. This is equivalent to assuming that the covariance matrix B is a diagonal matrix. In this case the parameters in r could specify the entries of B along its diagonal. As another example, it could be assumed that for origin-destination node pair P, the value of $E[W_p(k)W_p(k+m)]$ is expressible as a Taylor series expression in the variable m, where the coefficients are contained in the parameter vector r.

With this assumption, the matrix equations may be rewritten a form likely to be more familiar to one skilled in the art by stacking the entries of the square matrix $(Y-AX)(Y-AX)^T$ in a column vector $V_X$, similarly stacking the entries of Z in a column vector $\bar{Z}$. Then the equations may be rewritten as $V_X = Hr + D\bar{Z}$, for some matrices H and D. Given X, the vector $V_X$ is readily computed, and the parameter vector r may be estimated using the pseudo-inverse approach, meaning the estimate $\hat{r}$ of r is given by $\hat{r} = \hat{r}(X) = (H^T H)^{-1} H^T V_X$. This assumes that the rank of H is equal to the dimension of the parameter vector r, so that $(H^T H)^{-1}$ is invertible. Note that the estimate of r is unbiased since $\bar{Z}$ is zero mean.

The estimate $\hat{B}$ of B is then given by $\hat{B} = \hat{B}(\hat{X}) = B(\hat{r}(\hat{X}))$. A potential problem with this method is that the estimate $\hat{B}$ is not guaranteed to be positive semidefinite, as all covariance matrices must be.

In the second example method, the traffic fluctuation vector W may be directly estimated, which may then be used to estimate the covariance matrix B. Based upon the above, the equations may be written as $Y'(k) - A'(k)X = A'(k)W(k)$. Given X, the left-hand side of this equation is known. Since the rank of A is typically less than P, which is the dimension of W(k), there are infinitely many values of W(k) which satisfy this equation. To form an estimate $\hat{W}(k)$ of W(k), a solution may be found with the smallest possible Euclidian norm. Using standard vector space methods, the corresponding estimate is $\hat{W}(k) = (A'(k))^T (A'(k)(A'(k))^T)^{-1} (Y'(k) - A'(k)X)$.

Note that by construction the rows of matrix A'(k) are linearly independent, which implies that $A'(k)(A'(k))^T$ is positive definite, and therefore invertible. In this proposed method, since X is not known exactly, X may be replaced with the estimate $\hat{X}$. In so doing, estimates $\hat{W}(k)$ of W(k) may be obtained for each measurement interval k=0, 12, ..., K−1. If W(k) were observed directly, the covariance matrix B could be easily estimated. Since W(k) may not be observed directly, the estimate of $\hat{W}(k)$ is used in its place. As an example, based on modeling assumptions, it could be hypothesized that $E[W_p(k)W_q(k+m)] = 0$ p≠q and m≠0. In this case, the covariance matrix B would be completely determined by the value of $E[(W_p(k))^2] = Var(W_p(k)) = \sigma_p^2$ for all origin-destination node pairs. Such values are readily estimated according to $$\hat{\sigma}_P^2 = \frac{1}{K}\sum_{k=0}^{K-1}\left(\hat{W}_P(k)\right)^2.$$

If a user does not wish to assume that the traffic fluctuations are uncorrelated in time, the autocorrelation function of the traffic fluctuations could be estimated.

It is not clear whether one of the two above example methods for estimating the covariance matrix B may be more useful in practical application, and other methods may also be employed. The above examples are applicable to the estimation of a traffic matrix and the co-variance of the traffic matrix in a stationary data environment.

Of course, the traffic matrices in a series of snapshots for an IP network may not be stationary. The present invention may also be used to estimate the traffic matrix $X_p(k)$ and the covariance of the traffic in a non-stationary environment. The following examples describe possible methods in accordance with the present invention in a non-stationary environment.

As before let $A_{l,p}(k)$ be the fraction of the traffic $X_p(k)$ from an origin-destination node pair p that traverses link l during measurement interval k. Rather than assume that $\{X(k)\}$ is a random process with a constant mean, it may be assumed that $\{X(k)\}$ is cyclostationary. Specifically, this assumes that $X(k) = \bar{X}(k) + W(k)$, $0 \leq k < K$. The assumption that $\{X(k)\}$ is cyclostationary with period N, also means that X(k) and X(k+N) have the same marginal distribution. More specifically, it may be assumed that W(k) is zero mean and that $\{\bar{X}(k)\}$ is a deterministic (vector valued) sequence, periodic with period N. The noise vectors $\{W(k)\}$ may be assumed to be cyclostationary to a second order, meaning that $E[W(k)W^T(k+m)] = B^{(k,m)}$ where the covariance matrices $B^{(k,m)}$ are such that $B^{(k,m)} = B^{(k+N),m}$ for all k.

The goal of the example methods is to estimate X(k) for all k given the observations Y(k), $0 \leq k < K$. For the sake of simplicity, it may be assumed that K is an integer multiple of N.

It may be assumed that $\bar{X}(k)$ may be represented as the weighted sum of $2N_b+1$ given basis functions, $$\bar{X}(k) = \sum_{n=0}^{2N_b} \theta_n b_n(k).$$

In particular, a Fourier expansion may be used, where $$b_n(k) = \begin{cases} \cos(2\pi kn/N), & \text{if } 0 \leq k < N \text{ and } 0 \leq n \leq N_b \\ \sin(2\pi k(n-N_b)/N), & \text{if } 0 \leq k < N \text{ and } N_b + 1 \leq n \leq 2N_b \end{cases},$$

wherein $\theta_n$ is a P×1 vector $\theta_n = [\theta_{1n}\; \theta_{2n}\; \ldots\; \theta_{pn}]^T$. Through substitution, the following may be obtained:

$$Y'(k) = A'(k)\left(\sum_{n=0}^{2N_b}\theta_n b_n(k)\right) + A'(k)W(k) = A''(k)\theta + A'(k)W'(k)$$

where the $(2N_b+1)P \times 1$ vector $\theta$ is defined according to $$\theta = \begin{bmatrix} \theta_0 \\ \theta_1 \\ \ldots \\ \theta_{2N_b} \end{bmatrix}$$

and A"(k) is the $M_k \times (2N_b+1)P$ matrix defined as $A''(k) = [A'(k)b_0(k)\; A'(k)b_1(k)\; \ldots\; A'(k)b_{2N_b}(k)]$.

Next, the matrix A may be redefined to be of dimension $M \times (2N_b+1)P$ as follows:

$$A = \begin{bmatrix} A''(0) \\ A''(1) \\ \ldots \\ A''(K-1) \end{bmatrix}.$$

With this notation, the equation becomes $Y = A\theta + CW$.

From this point, essentially the same methods as was used in the stationary environment may be used to obtain an estimate of $\theta$, and hence an estimate for $X(k)$, for each time k. The same approaches as were used for the stationary environment may be used to estimate the covariance matrices. One skilled in the art will realize of course, that the equations used to iteratively perform these estimates will be expressed in terms of $\theta$ rather than X being determined using the estimate of $\theta$. These processes may then be used iteratively, as described above, until the estimates converge.

The methods in accordance with the present invention may be used either together or separately to obtain additional information regarding the traffic of an IP network and to estimate the traffic and covariance of traffic of an IP network. While the various methods of the present invention may be particularly useful when used together, any of the methods described herein, or variations of the methods described herein, may be useful separately in obtaining improved information regarding IP networks and improved modeling, estimation, and forecasting of IP network traffic patterns.

One particular advantage of methods in accordance with the present invention is that they may be employed using computer software. Such software may take a variety of forms, and may be written in any programming language running on any computing platform. Such software may be integrated with the link utilization data collection process employed by an IP network, and may be further linked to an automated process for adjusting link weights, if desired by the IP network operator.

The invention claimed is:

1. A method for estimating the mean traffic between origin-destination node pairs of an IP network comprising a plurality of nodes connected by a plurality of links, each link being assigned a weight used to determine the shortest path route between the shortest path route being the set of links connecting the nodes having the lowest possible sum of weights, the traffic matrix describing the total amount of traffic between each origin-destination node pair in the network over a given time period k being $X(k)$, the method comprising:

collecting link utilization values at different times denoted k, wherein k=0, 1, 2, ..., K−1;
  constructing link count vectors $Y(k)$ using the collected link utilization values;
  constructing routing matrices $A(k)$ using the IP network's topological information and the weight assigned to each link in the IP network at each time k, such that $Y(k)=A(k)X(k)$;
  deleting missing and redundant rows in $Y(k)$ and in $A(k)$ to produce $Y'(k)$ and $A'(k)$, such that $Y'(k)=A'(k)X(k)$;
  modeling the traffic matrix $X(k)$ as stationary, such that $X(k)=X+W(k)$, wherein $W(k)$ is a traffic fluctuation vector and X is a vector describing the mean traffic between each origin-destination node pair in the IP network;
  defining, in block matrix notation:

$$Y = \begin{bmatrix} Y'(0) \\ Y'(1) \\ \ldots \\ Y'(K-1) \end{bmatrix}; A = \begin{bmatrix} A'(0) \\ A'(1) \\ \ldots \\ A'(K-1) \end{bmatrix};$$

and
  estimating X, the vector describing the mean traffic between each origin-destination node pair in the IP network, as $\hat{X}$, such that $\hat{X}=(A^T A)^{-1} A^T Y$.

2. A method for estimating the mean traffic and the covariance of traffic between origin-destination node pairs of an IP network comprising a plurality of nodes connected by a plurality of links, each link being assigned a weight used to determine the shortest path route between each origin-destination node pairs, the shortest path route being the set of links connecting the nodes having the lowest possible sum of weights, the traffic matrix describing the total amount of traffic between each origin-destination node pair in the network over a given time period k being $X(k)$, the method comprising:

collecting link utilization values at different times denoted k, wherein k=0, 1, 2, ..., K−1;
  constructing link count vectors $Y(k)$ using the collected link utilization values;
  constructing routing matrices $A(k)$ using the IP network's topological information and the weight assigned to each link in the IP network at any time k, such that $Y'(k)=A'(k)X(k)$;
  deleting missing and redundant rows in $Y(k)$ and in $A(k)$ to produce $Y'(k)$ and $A'(k)$, such that $Y'(k)=A'(k)X(k)$;
  modeling the traffic matrix as stationary, such that $X(k)=X+W(k)$, wherein $W(k)$ is a traffic fluctuation matrix and x is a vector describing the mean traffic between each origin-destination node pair in the IP network;
  defining, in block matrix notation:

$$Y = \begin{bmatrix} Y'(0) \\ Y'(1) \\ \ldots \\ Y'(K-1) \end{bmatrix}; A = \begin{bmatrix} A'(0) \\ A'(1) \\ \ldots \\ A'(K-1) \end{bmatrix}; W = \begin{bmatrix} W(0) \\ W(1) \\ \ldots \\ W(K-1) \end{bmatrix}, \text{and}$$

$$C = \begin{bmatrix} A'(0) & 0 & \ldots & 0 \\ 0 & A'(1) & \ldots & 0 \\ \ldots & \ldots & \ldots & \ldots \\ 0 & 0 & \ldots & A'(K-1) \end{bmatrix};$$

defining B as the covariance matrix of W, such that $B=E[WW^T]$; and
  iteratively estimating X, the vector describing the mean traffic between each origin-destination node pair in the IP network, and B, the covariance of the traffic fluctuation matrix.

3. The method for estimating the mean traffic and the covariance of traffic between origin-destination node pairs of an IP network of claim 2, wherein estimating x comprises defining as an estimate $\hat{X}$, such that:

$$\hat{X} = \hat{X}(Y,B) = (A^T(CBC^T)^{-1}A^T(CBC^T)^{-1}Y.$$

4. The method for estimating the mean traffic and the covariance of traffic between origin-destination node pairs of an IP network of claim 2, wherein iteratively estimating X and B comprises:
estimating X as $\hat{X}$, such that:

$$\hat{X}=\hat{X}(Y,B)=(A^T(CBC^T)^{-1}A)^{-1}A^T(CBC^T)^{-1}Y,$$

using an estimate of B, the initial estimate being B=I, I being the identity matrix;
estimating B as $\hat{B}$, estimating B comprising:
defining Z, such that $Z=B-WW^T$, such that matrix manipulation and substitution yields $(Y-AX)(Y-AX)^T=CBC^T+CZC^T$;
modeling B as a linear function of a parameter vector r, such that $V_x=Hr+D\bar{Z}$, wherein $V_x$ is a column vector comprising $(Y-AX)(Y-AX)^T$ stacked, $\bar{Z}$ is a column vector comprising Z stacked, H is a matrix of rank equal to the dimension of r, and D is a matrix;
estimating r as $\hat{r}$ using $\hat{X}$, such that $\hat{r}=\hat{r}(x)=(H^TH)^-H^TV_x$;
calculating $\hat{B}$ using $\hat{r}$; and
iteratively calculating $\hat{X}$ using $\hat{B}$ and calculating $\hat{B}$ using $\hat{X}$ until the estimates of $\hat{X}$ and $\hat{B}$ both converge.

5. The method for estimating the mean traffic and the covariance of traffic between origin-destination node pairs of an IP network of claim 2, wherein iteratively estimating X and B comprises:
estimating X as $\hat{X}$, such that:

$$\hat{X}=\hat{X}(Y,B)=(A^T(CBC^T)^{-1}A)^{-1}A^T(CBC^T)^{-1}Y,$$

using an estimate of B, the initial estimate being B=I, I being the identity matrix;
estimating B as $\hat{B}$, estimating B comprising:
estimating W as $\hat{W}$, such that:

$$\hat{W}(k)=(A'(k))^T(A'(k)(A'(k))^T)^{-1}(Y(k)-A'(k)X);$$

calculating $\hat{B}$ as $\hat{B}=E[\hat{W}\hat{W}^T]$; and
iteratively calculating $\hat{X}$ using $\hat{B}$ and calculating $\hat{B}$ using $\hat{X}$ until the estimates of $\hat{X}$ and $\hat{B}$ both converge.

6. The method for estimating the mean traffic and the covariance of the traffic between nodes of an IP network of claim 5, wherein if $E[W_p(k)W_q(k+m)]=0$ for $p\neq q$ and $m\neq 0$; estimating B as $\hat{B}$ comprises:
defining:

$$\hat{B}=E[(W_p(k))^2]=Var(W_p(k))=\tau_p^2;\text{ and}$$

estimating $\sigma_p^2$ as $\hat{\sigma}_p^2$, such that $$\hat{\sigma}_P^2 = \frac{1}{K}\sum_{k=0}^{K-1}(\hat{W}_p(k))^2.$$

7. The method for estimating the mean traffic and the covariance of traffic between origin-destination node pairs of an IP network of claim 5, wherein estimating W comprises estimating the autocorrelation function of the traffic fluctuations without assuming that the traffic fluctuations are uncorrelated in time.

8. The method for estimating the mean traffic and the covariance of traffic between origin-destination node pairs of an IP network of claim 2, wherein collecting link utilization values at different times denoted k comprises collecting link utilization values daily.

9. The method for estimating the mean traffic and the covariance of traffic between origin-destination node pairs of an IP network of claim 4, wherein collecting link utilization values at different times denoted k comprises collecting link utilization values daily.

10. The method for estimating the mean traffic and the covariance of traffic between origin-destination node pairs of an IP network of claim 5, wherein collecting link utilization values at different times denoted k comprises collecting link utilization values daily.

11. A computer readable media for causing a computer to perform a method for estimating the mean traffic and the covariance of traffic between origin-destination node pairs of an IP network, the method for estimating the mean traffic and the covariance of traffic comprising:
collecting link utilization values at different times denoted k, wherein k=0, 1, 2, ..., K−1;
constructing link count vectors Y(k) using the collected link utilization values;
constructing routing matrices A(k) using the IP network's topological information and the weight assigned to each link in the IP network at each time k, such that Y(k)=A(k)X(k);
deleting missing and redundant rows in Y(k) and in A(k) to produce Y'(k) and A'(k), such that Y'(k)=A'(k)X(k);
modeling the traffic matrix X(k) as stationary, such that X(k)=X+W(k), wherein W(k) is a traffic fluctuation vector and X is a vector describing the mean traffic between each origin-destination node pair in the IP network;
defining, in block matrix notation:

$$Y = \begin{bmatrix} Y'(0) \\ Y'(1) \\ \ldots \\ Y'(K-1) \end{bmatrix}; A = \begin{bmatrix} A'(0) \\ A'(1) \\ \ldots \\ A'(K-1) \end{bmatrix};$$

and
estimating X, the vector describing the mean traffic between each origin-destination node pair in the IP network, as $\hat{X}$, such that $\hat{X}=(A^TA)^{-1}A^TY$.

12. A computer readable media for causing a computer to perform a method for estimating the mean traffic and the covariance of traffic between origin-destination node pairs of an IP network comprising a plurality of nodes connected by a plurality of links, each link being assigned a weight used to determine the shortest path route between each origin-destination node pairs, the shortest path route being the set of links connecting the nodes having the lowest possible sum of weights, the traffic matrix describing the total amount of traffic between each origin-destination node pair in the network over a given time period k being X(k), the method comprising:
collecting link utilization values at different times denoted k, wherein k=0, 1, 2, ..., K−1;
constructing link count vectors Y(k) using the collected link utilization values;
constructing routing matrices A(k) using the IP network's topological information and the weight assigned to each link in the IP network at any time k, such that Y'(k)=A'(k)X(k);
deleting missing and redundant rows in Y(k) and in A(k) to produce Y'(k) and A'(k), such that Y'(k)=A'(k)X(k);
modeling the traffic matrix as stationary, such that X(k)=X+W(k), wherein W(k) is a traffic fluctuation matrix and X is a vector describing the mean traffic between each origin-destination node pair in the IP network;

defining, in block matrix notation:

$$Y = \begin{bmatrix} Y'(0) \\ Y'(1) \\ \dots \\ Y'(K-1) \end{bmatrix}; A = \begin{bmatrix} A'(0) \\ A'(1) \\ \dots \\ A'(K-1) \end{bmatrix}; W = \begin{bmatrix} W(0) \\ W(1) \\ \dots \\ W(K-1) \end{bmatrix};$$

and $$C = \begin{bmatrix} A'(0) & 0 & \dots & 0 \\ 0 & A'(1) & \dots & 0 \\ \dots & \dots & \dots & \dots \\ 0 & 0 & \dots & A'(K-1) \end{bmatrix};$$

defining B as the covariance matrix of W, such that $B=E[WW^T]$; and iteratively estimating X, the vector describing the mean traffic between each origin-destination node pair in the IP network, and B, the covariance of the traffic fluctuation matrix.

13. The computer readable media of claim 12, wherein estimating x comprises defining as an estimate $\hat{X}$, such that:

$$\hat{X}=\hat{X}(Y,B)=(A^T(CBC^T)^{-1}A)^{-1}A^T(CBC^T)^{-1}Y.$$

14. The computer readable media of claim 12, wherein iteratively estimating X and B comprises:
estimating X as $\hat{X}$, such that:

$$\hat{X}=\hat{X}(Y,B)=(A^T(CBC^T)^{-1}A)^{-1}A^T(CBC^T)^{-1}Y,$$

using an estimate of B, the initial estimate being B=I, I being the identity matrix;
estimating B as $\hat{B}$, estimating B comprising:
defining Z, such that $Z=B-WW^T$, such that matrix manipulation and substitution yields $(Y-AX)(Y-AX)^T=CBC^T+CZC^T$;
modeling B as a linear function of a parameter vector r, such that $V_x = Hr + D\overline{Z}$, wherein $V_x$ is a column vector comprising $(Y-AX)(Y-AX)^T$ stacked, $\overline{Z}$ is a column vector comprising Z stacked, H is a matrix of rank equal to the dimension of r, and D is a matrix;
estimating r as $\hat{r}$ using $\hat{X}$, such that $\hat{r}=\hat{r}(X)=(H^TH)^{-1}H^TV_X$;
calculating $\hat{B}$ using $\hat{r}$; and
iteratively calculating $\hat{X}$ using $\hat{B}$ and calculating $\hat{B}$ using $\hat{X}$ until the estimates of $\hat{X}$ and $\hat{B}$ both converge.

15. The computer readable media of claim 12, wherein iteratively estimating X and B comprises:
estimating X as $\hat{X}$, such that:

$$\hat{X}=\hat{X}(Y,B)=(A^T(CBC^T)^{-1}A)^{-1}A^T(CBC^T)^{-1}Y,$$

using an estimate of B, the initial estimate being B=I, I being the identity matrix;
estimating B as $\hat{B}$, estimating B comprising:
estimating W as $\hat{W}$, such that:

$$\hat{W}(k)=(A'(k))^T(A'(k)(A'(k))^T)^{-1}(Y'(k)-A'(k)X);$$

calculating $\hat{B}$ as $\hat{B}=E[\hat{W}\hat{W}^T]$; and
iteratively calculating $\hat{X}$ using $\hat{B}$ and calculating $\hat{B}$ using $\hat{X}$ until the estimates of $\hat{X}$ and $\hat{B}$ both converge.

16. The computer readable media of claim 15, wherein if $E[W_p(k)W_q(k+m)]=0$ for $p \neq q$ and $m \neq 0$; estimating B as $\hat{B}$ comprises:
defining:

$$\hat{B}=E[(W_p(k))^2]=Var(W_p(k))=\sigma_p^2; \text{ and}$$

estimating $\sigma_p^2$ as $\hat{\sigma}_p^2$, such that $$\hat{\sigma}_p^2 = \frac{1}{K}\sum_{k=0}^{K-1}(\hat{W}_p(k))^2.$$

17. The computer readable media of claim 15, wherein estimating W comprises estimating the autocorrelation function of the traffic fluctuations without assuming that the traffic fluctuations are uncorrelated in time.

18. The computer readable media of claim 12, wherein collecting link utilization values at different times denoted k comprises collecting link utilization values daily.

19. The computer readable media of claim 14, wherein collecting link utilization values at different times denoted k comprises collecting link utilization values daily.

20. The computer readable media of claim 15, wherein collecting link utilization values at different times denoted k comprises collecting link utilization values daily.

* * * * *

UNITED STATES PATENT AND TRADEMARK OFFICE
CERTIFICATE OF CORRECTION

PATENT NO. : 7,353,294 B2  
APPLICATION NO. : 10/702698  
DATED : April 1, 2008  
INVENTOR(S) : Nucci et al.

Page 1 of 1

It is certified that error appears in the above-identified patent and that said Letters Patent is hereby corrected as shown below:

Col. 29, Claim 4, line 19, " $\hat{r}=\hat{r}(x)=(H^T H)^{-1} H^T V_x$ " should read -- $\hat{r} = \hat{r}(x) = (H^T H)^{-1} H^T V_x$ --.

Col. 29, Claim 6, line 45, " $\hat{B}=E[(W_p(k))^2]=Var(W_p(k))=\tau_p^2$ " should read -- $\hat{B} = E\left[(W_p(k))^2\right] = Var(W_p(k)) = \sigma_p^2$ --.

Col. 32, Claim 16, line 24, " $\hat{B}=E[(W_p(k))^2]=Var(W_p(k))=\sigma_p^2$ " should read -- $\hat{B} = E\left[(W_p(k))^2\right] = Var(W_p(k))$ --.

Col. 32, Claim 16, line 25, " $\sigma_p^2$ " should read -- $\sigma_p^2$ --.

Col. 32, Claim 16, line 25, " $\hat{\sigma}_p^2$ " should read -- $\hat{\sigma}_p^2$ --.

Col. 32, Claim 16, line 29, " $\hat{\sigma}_p^2 = \frac{1}{K}\sum_{k=0}^{K-1}(\hat{W}_p(k))^2$ " should read -- $\hat{\sigma}_p^2 = \frac{1}{K}\sum_{k=0}^{K-1}\left(\hat{W}_p(k)\right)^2$ --.

Signed and Sealed this

Thirty-first Day of March, 2009

JOHN DOLL  
*Acting Director of the United States Patent and Trademark Office*